US010752448B2

(12) United States Patent
Yoder et al.

(10) Patent No.: US 10,752,448 B2
(45) Date of Patent: Aug. 25, 2020

(54) DEVICES AND METHODS FOR CAN AND BOTTLE MAKING RECIRCULATION SYSTEMS

(71) Applicant: BELVAC PRODUCTION MACHINERY, INC., Lynchburg, VA (US)

(72) Inventors: Randy E. Yoder, Forest, VA (US); Patrick Yerby, Lynchburg, VA (US)

(73) Assignee: BELVAC PRODUCTION MACHINERY, INC., Lynchburg, VA (US)

( * ) Notice: Subject to any disclaimer, the term of this patent is extended or adjusted under 35 U.S.C. 154(b) by 0 days.

(21) Appl. No.: 16/400,555

(22) Filed: May 1, 2019

(65) Prior Publication Data

US 2019/0337732 A1 Nov. 7, 2019

Related U.S. Application Data

(60) Provisional application No. 62/665,810, filed on May 2, 2018.

(51) Int. Cl.
*B65G 47/51* (2006.01)
*B65G 47/68* (2006.01)
(Continued)

(52) U.S. Cl.
CPC ......... *B65G 47/5145* (2013.01); *B65G 29/00* (2013.01); *B65G 47/5136* (2013.01);
(Continued)

(58) Field of Classification Search
CPC .............................. B65G 47/5145; B65G 29/00; B65G 47/5136; B65G 47/682; B65G 47/846
(Continued)

(56) References Cited

U.S. PATENT DOCUMENTS

2009/0014281 A1 1/2009 Eder
2010/0212393 A1 8/2010 Babbitt
(Continued)

FOREIGN PATENT DOCUMENTS

EP      3 124 409 A1     1/2017
EP      3124409 A1  *   2/2017   ............. B65G 15/00
JP      S 59-223623 A   12/1984

OTHER PUBLICATIONS

International Search Report in International Patent Application No. PCT/US2019/030464, dated Jul. 16, 2019 (10 pages).

*Primary Examiner* — Gene O Crawford
*Assistant Examiner* — Lester Ill Rushin
(74) *Attorney, Agent, or Firm* — Nixon Peabody LLP

(57) ABSTRACT

A device for transporting articles through a recirculation system for forming or processing the articles. The device includes a top portion configured to contact an article and a drive nut positioned within a first aperture of the top portion. The device includes a hub portion having a second aperture and a plurality of ejection pins extending through a respective one of a plurality of apertures of the top portion. The device includes a paddle wheel rotatably coupled to the hub portion. The paddle wheel has a first and second plurality of prongs extending radially outward and offset in generally opposing directions. The paddle wheel includes a post projecting radially inward and positioned within a third aperture. The device includes a drive screw extending through the first, second, and third apertures and having a head configured to engage the post and a threaded end is configured to engage the drive nut.

20 Claims, 36 Drawing Sheets

(51) Int. Cl.
*B65G 47/84* (2006.01)
*B65G 29/00* (2006.01)

(52) U.S. Cl.
CPC ......... *B65G 47/682* (2013.01); *B65G 47/846* (2013.01); *B65G 2201/0244* (2013.01); *B65G 2201/0252* (2013.01)

(58) Field of Classification Search
USPC ........................................................ 198/434
See application file for complete search history.

(56) References Cited

U.S. PATENT DOCUMENTS

| | | |
|---|---|---|
| 2010/0212394 A1 | 8/2010 | Babbitt |
| 2013/0149073 A1 | 6/2013 | Babbitt |
| 2016/0361750 A1 | 12/2016 | Lee |

\* cited by examiner

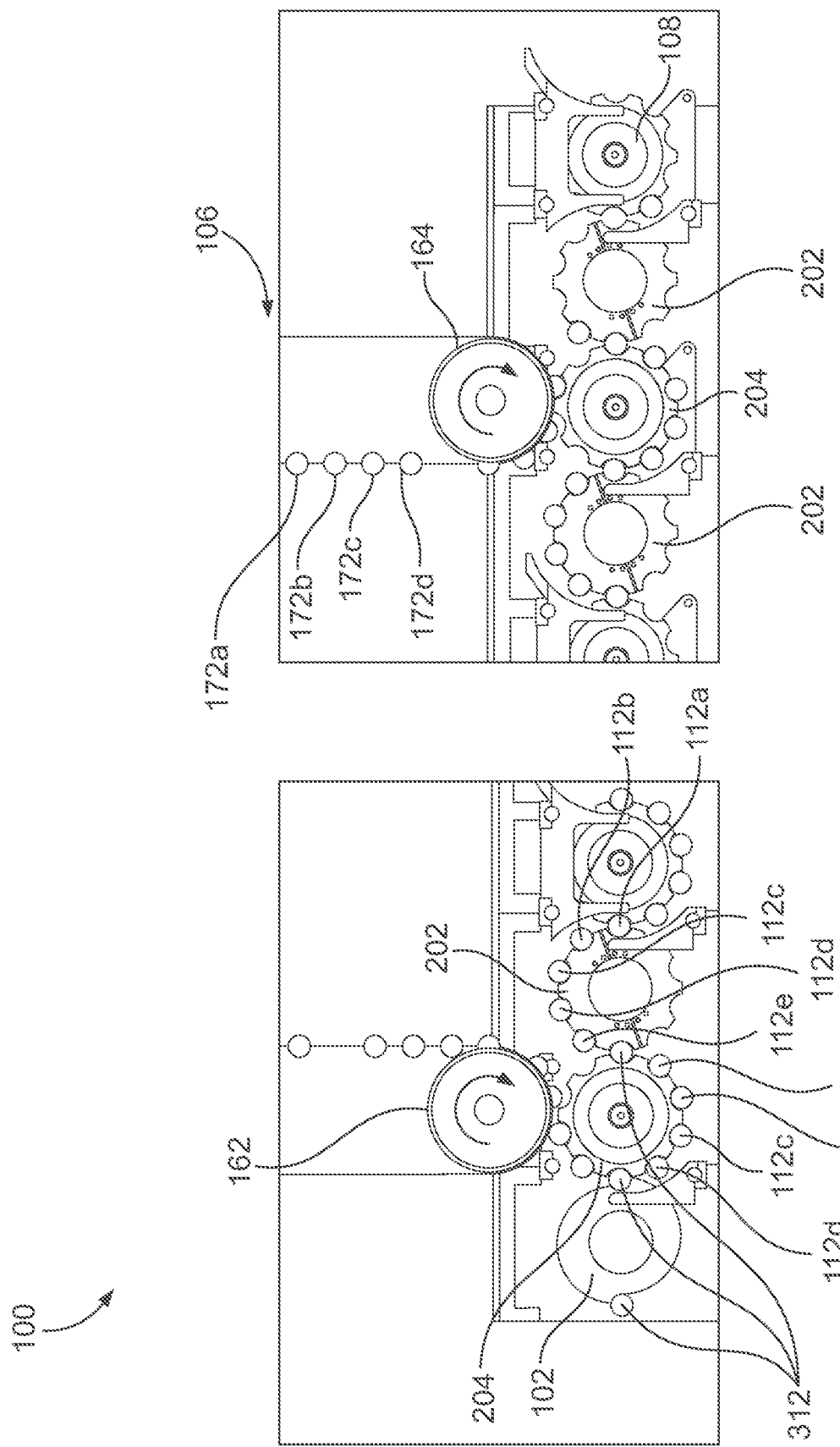

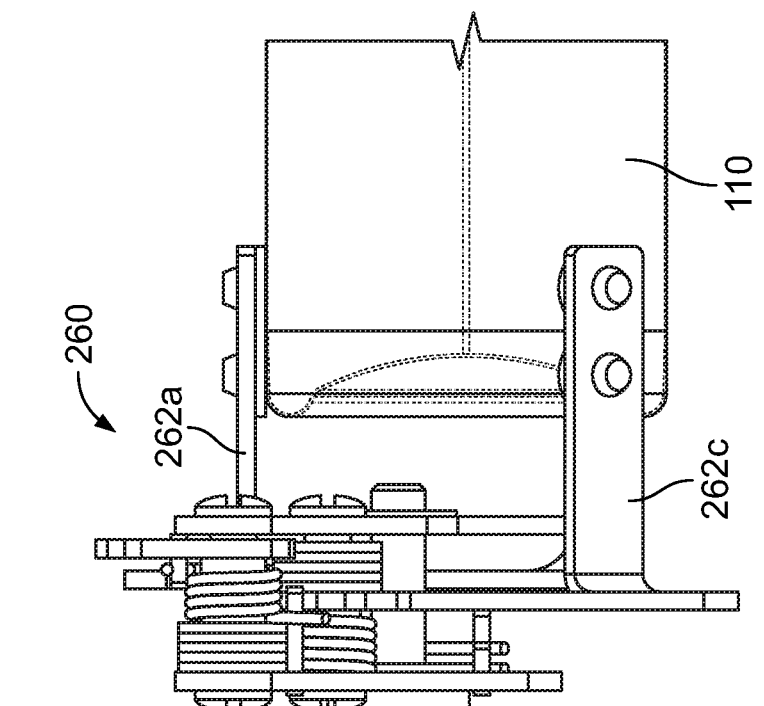
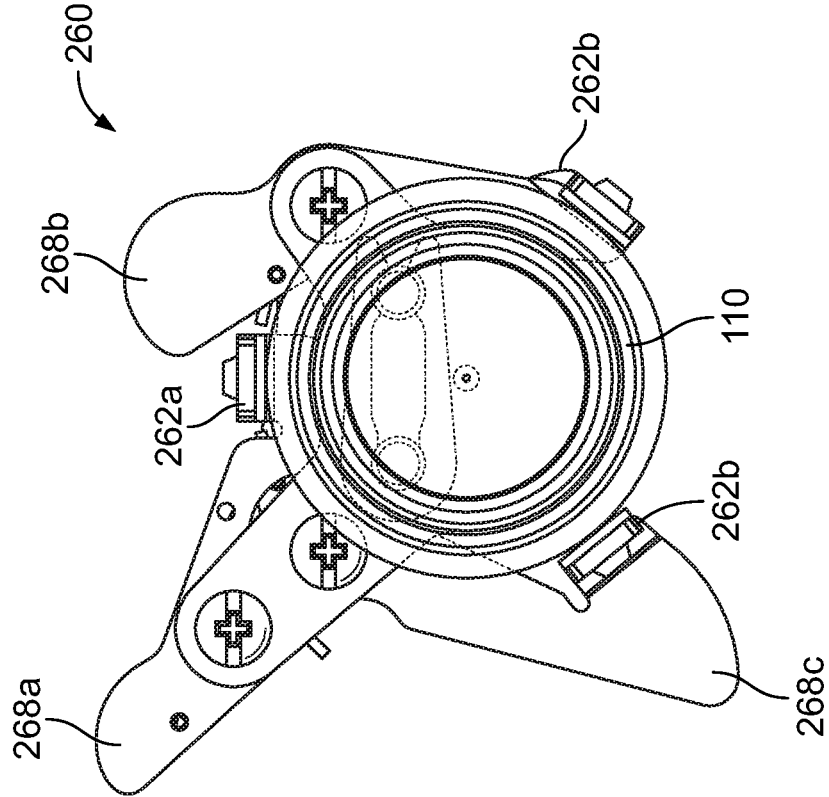
FIG. 11C
FIG. 11B

DEVICES AND METHODS FOR CAN AND BOTTLE MAKING RECIRCULATION SYSTEMS

CROSS-REFERENCE TO RELATED APPLICATIONS

This application claims priority to U.S. Provisional Patent Application No. 62/665,810, filed May 2, 2018, which is hereby incorporated by reference herein in its entirety.

FIELD OF THE INVENTION

The present disclosure relates generally to manufacturing articles such as beverage containers, and more particularly, to devices and methods for recirculating containers during manufacturing.

BACKGROUND

Conventional machine arrangements for bottle and can manufacturing are typically linear and are generally referred to as machine lines. That is, the machine lines, with each and every processing and/or forming machine, extend in a single line. The articles are passed through the machine line only once to achieve a desired stage of manufacture. Such a "single-pass" arrangement may take up a large amount of space in a warehouse, factory, or other location. Occasionally, buildings are not large enough or long enough to house such complex and long machine arrangements. For example, in bottle or can operations, many different types of processes need to be performed on the bottle or can, such as necking, curling, expansion, trimming, etc. Each type of process may also require a plurality of machines to sufficiently perform the overall process. For instance, necking operations may require multiple operations with multiple machines in order to properly neck a bottle or can of a certain length or size. A downside of the conventional single-pass arrangement is that the machine lines may need to include duplicate or additional machines to perform the desired function(s), increasing both the cost and footprint of these machines.

Machine arrangements have been developed that perform a single recirculation of cans or bottles. Such arrangements extract cans or bottles from a downstream point after they have passed through the machine line once and transport the cans or bottles to an upstream point for reloading the machine to effect a second pass through the machine line. That is, each processing or forming machine in the machine line within the recirculation loop receives cans or bottles at two different stages of manufacturing. On the first pass through the machine line, each machine performs a first operation on the cans or bottles. These operations result in cans or bottles at a single stage of manufacture. These cans or bottles are then recirculated for a second pass through the machine line. On the second pass, each machine performs a second operation on the can or bottle, resulting in a can or bottle at the desired stage of manufacture. The can or bottle is then passed to subsequent downstream single pass machine operations then output from the machine line for further processing. These machine arrangements achieve the same number of required process stages with as little as half the number of line starwheels versus a single-pass counterpart. This results in a generally lower-cost machine with a generally smaller footprint, but sacrifices throughput of the machine. In such a two-pass system, the cans or bottles received by the recirculation loop are always at the same stage of manufacture.

Such two-pass systems are non-synchronous, as they do not require pocket correlation in that only a single-stage container is involved. The non-synchronous nature of such a system prevents performance of more than one recirculation because the cans or bottles may be placed in the wrong position for recirculation. Such improper placement results in collisions, jams, non-uniform products being delivered downstream from the system, combinations thereof, or the like.

Two pass recirculation typically employs vacuum belt technology for extracting the container from a starwheel (e.g., a necker), while typically employing legacy gravity infeed track technology for re-introduction of the container into the necker. Random accumulative conveyance has been used for transport between extraction and re-introduction. The implementation of a multi-pass recirculation loop with more than two passes requires that discrete pocket correlation be maintained during the entire recirculation loop. Random accumulation during transport does not provide necessary pocket correlation.

Thus, development of a discrete container transport system presents the need for new container handling equipment and hardware.

BRIEF SUMMARY

According to some aspects of the present disclosure, a device for transporting articles through a recirculation system used for forming or processing the articles is disclosed. The device comprises a top portion configured to contact an article. The top portion has a drive nut positioned within a first generally central aperture. The top portion further includes a plurality of apertures. The device further includes a hub portion having a second generally central aperture. The hub portion further includes a plurality of ejection pins extending therefrom. The plurality of ejection pins is configured to extend through a respective one of the plurality of apertures of the top portion such that the hub portion is slidably coupled to the top portion. The device further includes a paddle wheel rotatably coupled to the hub portion. The paddle wheel has a first plurality of prongs and a second plurality of prongs. The first and second plurality of prongs extend radially outward and are offset in generally opposing directions. The paddle wheel further includes a post projecting radially inward and positioned within a third generally central aperture. The device further includes a drive screw extending through the first, second, and third apertures. The drive screw has a head and a generally opposing threaded end. The head is configured to engage the post, and the threaded end is configured to engage the drive nut.

According to further aspects of the present disclosure, a recirculation system for transporting a plurality of articles being processed is disclosed. The system comprises a plurality of line starwheels being cooperatively arranged to form a process line. Each of the plurality of line starwheels includes a plurality of starwheel pockets thereon. The system further comprises a recirculation line including a conveyor and a plurality of gripper devices coupled to the conveyor. The plurality of gripper devices is configured to secure and transport the plurality of articles along the recirculation line. Each of the plurality of gripper devices includes a top portion having an article contact surface and a plurality of apertures therethrough. Each of the plurality of gripper device further includes a plurality of ejection pins configured to extend through a respective one of the plurality of apertures. Each of the plurality of gripper device further includes a paddle wheel having a first plurality of prongs and a second plurality of prongs extending generally radially outward therefrom and offset in generally opposing directions. The paddle wheel is rotatable with respect to the top portion. The recirculation line further includes a first actuator located at a first position along the recirculation line. The first actuator has a first plurality of teeth configured to engage the first plurality of prongs to cause the paddle wheel to rotate in a first direction such that the plurality of ejection pins extends from the plurality of apertures. The recirculation line further includes a second actuator located at a second position along the recirculation line. The second actuator has a second plurality of teeth configured to engage the second plurality of prongs to cause the paddle wheel to rotate in a second direction such that the plurality of ejection pins retracts from the plurality of apertures.

According to still further aspects of the present disclosure, a method of modifying articles is disclosed. The method comprises providing an article to be modified to a plurality of line starwheels. Each of the plurality of line starwheels includes a plurality of starwheel pockets thereon. The method further includes modifying the article using at least one of the line starwheels to form a first-pass article. The method further includes transferring the first-pass article to a gripper device coupled to a conveyor of a recirculation line, the gripper device being in an extended position. The gripper device includes a top portion having an article contact surface and a plurality of apertures therethrough. The gripper device further includes a plurality of ejection pins configured to extend through a respective one of the plurality of apertures. The gripper device further includes a paddle wheel having a first plurality of prongs and a second plurality of prongs extending generally radially outward therefrom. The first and second plurality of prongs are offset in generally opposing directions. The paddle wheel is rotatable with respect to the top portion. The method further includes moving the gripper device along the recirculation line to contact a first actuator along the path of the recirculation line. Each of the first plurality of prongs on the paddle wheel engages a respective one of a plurality of teeth of the first actuator. The method further includes, in response to the plurality of teeth of the first actuator engaging a respective one of the first plurality of prongs of the gripper device, rotating the paddle wheel in a first direction such that a plurality of ejection pins extends through the contact surface of the gripper device. The ejection pins push the closed bottom surface of the first-pass article away from the contact surface such that the article is released from the gripper device. The method further includes further moving the gripper device along the recirculation line to contact a second actuator along the path of the recirculation line. Each of the second plurality of prongs on the gripper device engage with a respective one of a plurality of teeth of the second actuator. The method further includes, in response to the plurality of teeth of the second actuator engaging a respective one of the second plurality of prongs, rotating the paddle wheel in a second direction such that a plurality of ejection pins retracts through the contact surface of the gripper device such that the gripper device is in an extended position configured to receive a second article.

BRIEF DESCRIPTION OF THE DRAWINGS

FIG. 2 illustrates a schematic view of line starwheels from a portion of the example system of FIG. 1a.

FIG. 3a illustrates an expanded view of the interfaces between line starwheels and a recirculation line within the example system of FIG. 1.

FIG. 3b illustrates another expanded view of the interfaces between line starwheels and a recirculation line within the example system of FIG. 1.

FIG. 10b illustrates a front view of the gripper device of FIG. 10a.

FIG. 11b illustrates a front view of the gripper device of FIG. 11a.

FIG. 11c illustrates a side view of the gripper device of FIGS. 11a, 11b.

FIG. 12b illustrates a front view of the gripper device of FIG. 12a.

FIG. 14b illustrates a front view of the gripper device of FIG. 14a.

Figure 1A:
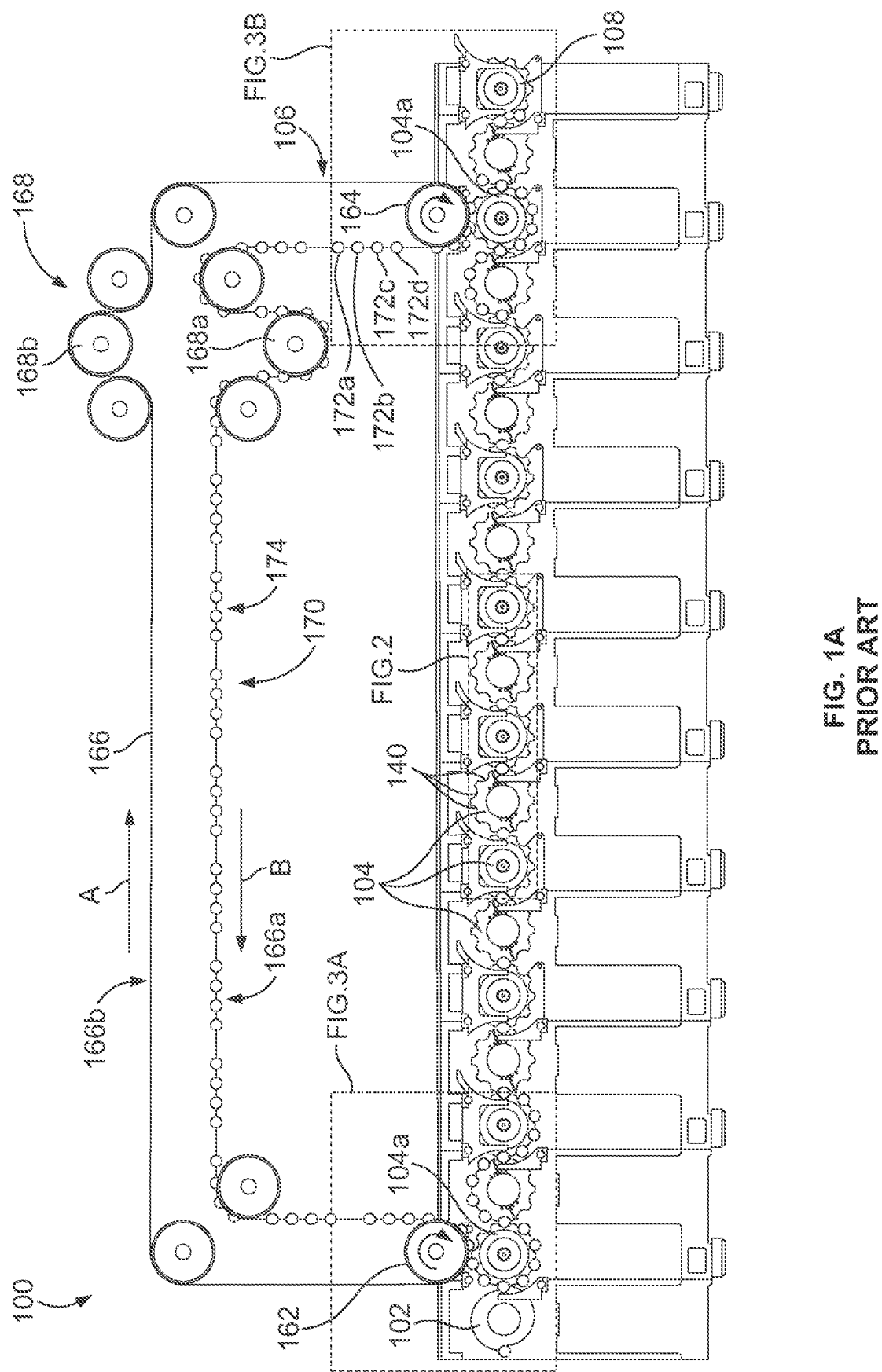
FIG. 1a illustrates a schematic view of an example system having a recirculation line for performing multiple passes of containers, according to an embodiment.

While the invention is susceptible to various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention.

DETAILED DESCRIPTION

Aspects of the present invention address the problem of recirculating articles at varying stages of manufacture using a single recirculation line. In particular, the recirculation line includes a plurality of pockets, each being configured to receive an article at a particular, different stage of manufacture. The recirculation line further includes a plurality of gripper devices positioned along the recirculation line for securing and transporting the articles through a multi-pass process. The recirculation line is synchronized with the machine line so that each received article is transported to the correct pocket when recirculated through the machine line. Advantageously, this allows the manufacturing of containers to occur with fewer line starwheels, resulting in a generally lower cost machine with a smaller footprint than a single- or two-pass machine.

Figure 1B:
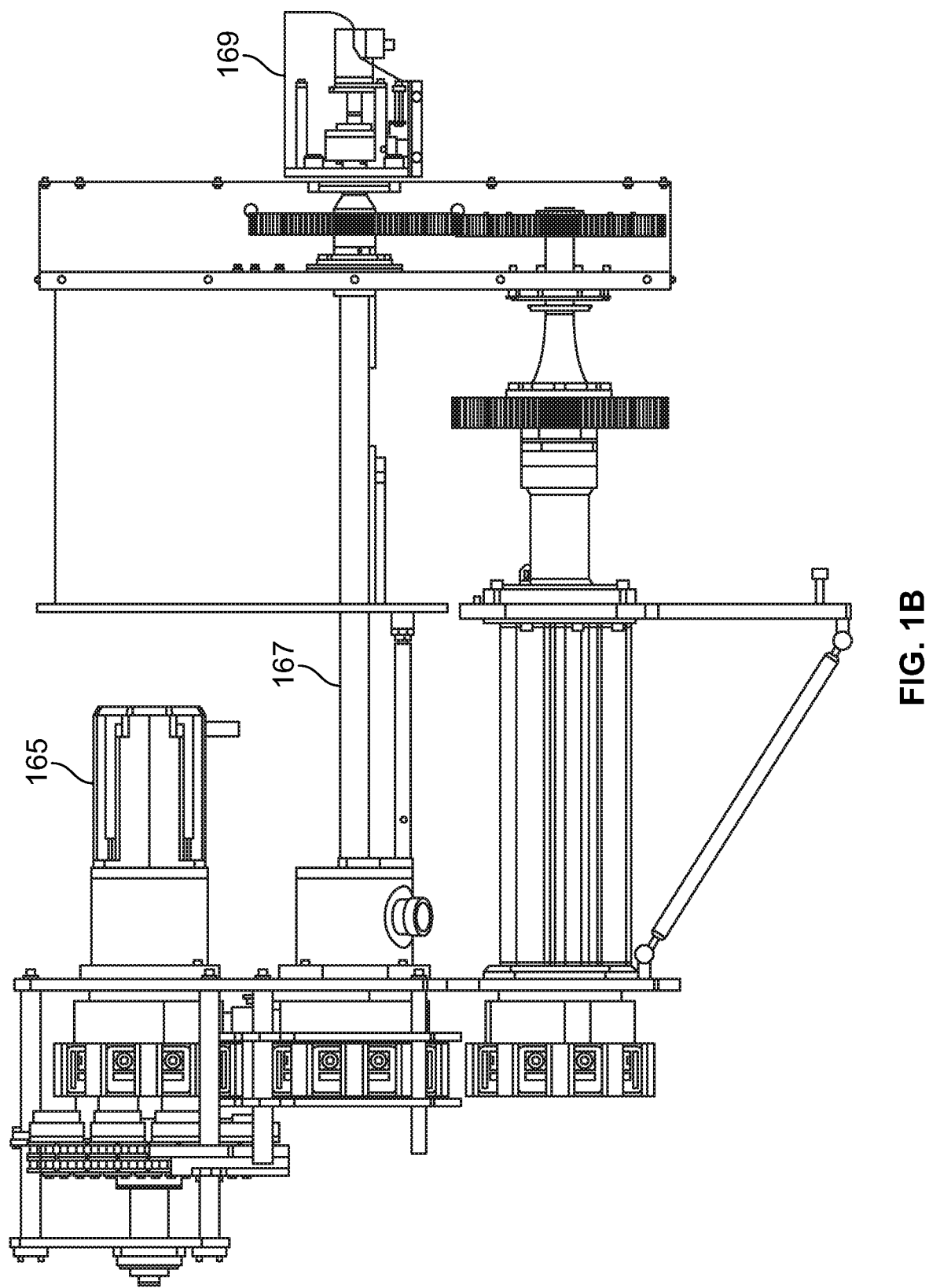
FIG. 1b illustrates a portion of a recirculation line utilizing a servo motor.
Figure 2:
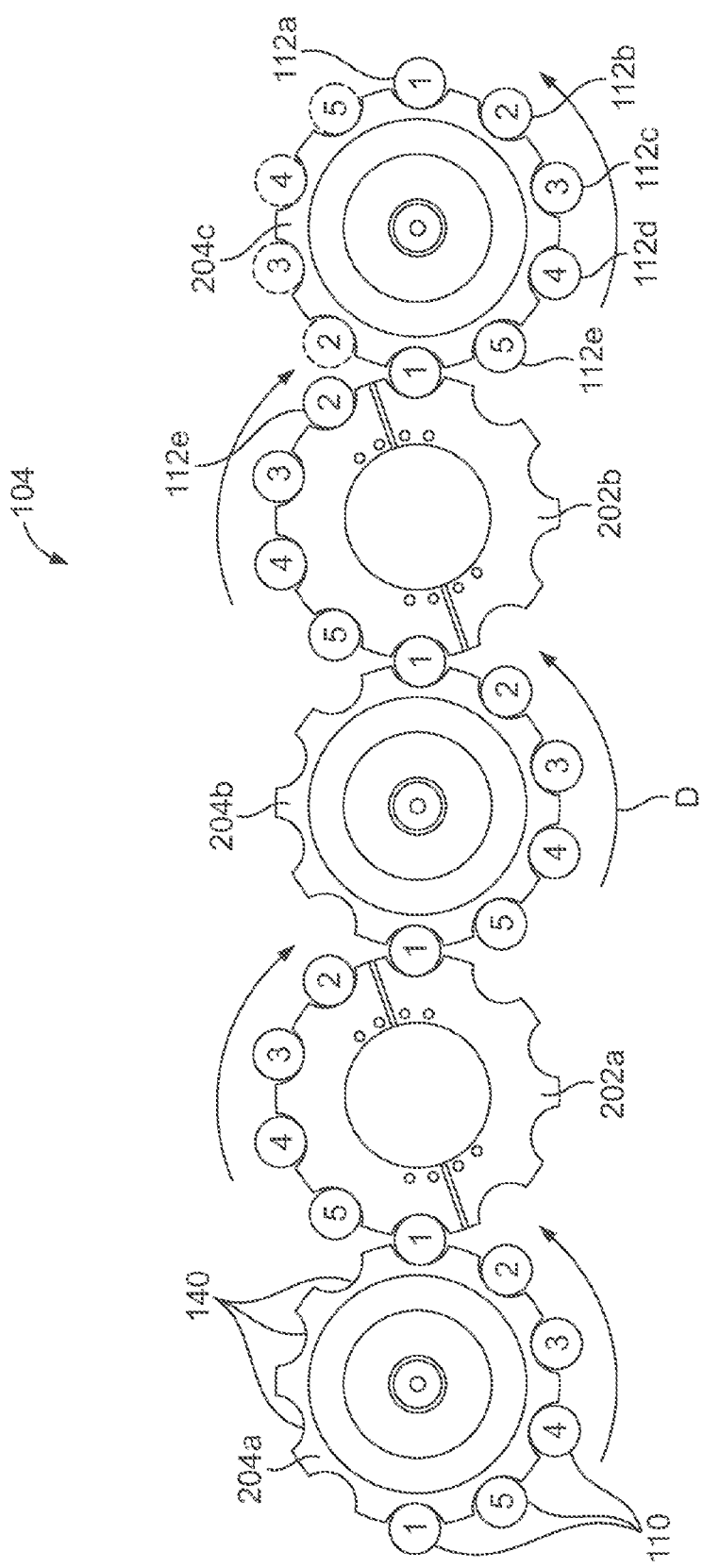

FIGS. 1-3 illustrate a system 100 for forming articles 110. The articles 110 may be cans, any suitable food or beverage containers, jars, bottles, or any other suitable articles of manufacture. The articles may be formed of a metal, metal alloy, polymers, any other suitable material, or combinations thereof. Each of the articles 110 has an open end opposite a closed end and at least one sidewall bridging the open end and the closed end. A top, lid, or other closure may be added to the articles 110 during an operation by the system 100 or at a later stage.

Referring now to FIG. 1, the system 100 includes an infeed starwheel 102, a plurality of line starwheels 104, a recirculation line 106, and an outfeed starwheel 108. The infeed starwheel 102 receives articles 110 to be formed and supplies the articles 110 to the line starwheels 104 at regular intervals. In the illustrated example, the infeed starwheel 102 supplies the articles 110 to the line starwheels 104 at a rate of one article 110 per half revolution.

The line starwheels 104 are cooperatively arranged to form a process line. Each of the line starwheels 104 includes a plurality of starwheel pockets 140 thereon. In the illustrated example, each line starwheel 104 includes ten starwheel pockets 140 disposed at generally regular intervals about its periphery. Each starwheel pocket 140 is configured to receive the articles 110 at a respective predetermined stage of manufacture.

The recirculation line 106 of FIGS. 1-3 includes a head pulley 162, a tail pulley 164, a conveyor 166, and a takeup mechanism 168. The conveyor 166 runs between the head pulley 162 and the tail pulley 164. The conveyor 166 has a working side 166a and a return side 166b. The working side 166a of the conveyor 166 travels from the tail pulley 164 to the head pulley 162 in a direction denoted by Arrow B. The return side 166b of the conveyor 166 travels from the head pulley 162 to the tail pulley 164 in a direction denoted by Arrow A. The conveyor 166 can be any mechanism suitable to move the articles from a first location to a second location, such as a chain, belt, tabletop chain, roller chain, or the like.

The conveyor 166 includes a plurality of line-pocket sets 170 disposed thereon. Each of the plurality of line-pocket sets 170 includes a plurality of individual line pockets 172a-d. Each of the line pockets 172a-d is configured to receive an article 110 at a predetermined stage of manufacture from a downstream line starwheel 104d and transport the received article 110 to an upstream line starwheel 104u. In embodiments where the conveyor 166 employs, for example, a tabletop chain, the line pockets 172a-d may be a designated position on the tabletop chain. The tabletop chain can include protrusions such as projections, extensions, lugs, lips, or the like to help inhibit movement of the articles relative to the conveyor 166.

In the illustrated embodiment, each article 110 passes through the line starwheels 104 five times before being passed downstream from the system 100 via the outfeed starwheel 108. That is, each article is recycled four times. To accomplish this, each line-pocket set 170 includes a first line pocket 172a, a second line pocket 172b, a third line pocket 172c, and a fourth line pocket 172d.

The conveyor 166 may be driven by the head pulley 162 and/or the tail pulley 164. The rotational speed of the head pulley 162 and/or the tail pulley 164 is selected to properly time each of the line pockets 172a-d with a respective one of the starwheel pockets 140 of the upstream and downstream starwheels 104u, d so that the articles 110 can be passed between the conveyor 166 and starwheels 104 without jamming. The rotation of the head pulley 162 is synchronized with the rotation of the upstream line starwheel 104u and the rotation of the tail pulley 164 is synchronized with the rotation of the downstream starwheel 104d using at least one synchronization mechanism (not shown). Because each of the starwheels in the machine line synchronously rotates, the rotation of the head pulley 162 and the tail pulley 164 is synchronized as well.

The synchronization mechanism can be any mechanism suitable to synchronize the rotation of the head pulley 162 with the upstream line starwheel 104u and to synchronize the rotation of the tail pulley 164 with the downstream starwheel 104d. In some aspects, mechanical linkages may be used to drive and synchronize the rotation of the head pulley 162 and the tail pulley 164. For example, the head pulley 162 may be mechanically linked to the upstream line starwheel 104u using a geartrain or a timing chain and, similarly, the tail pulley 164 and the downstream starwheel 104d may be mechanically linked using a geartrain or a timing chain. Thus, synchronization is achieved by fixing the timing of the starwheels at, e.g., the intermediate infeed and intermediate discharge.

In some aspects, one or more servo motors 165 (see FIG. 1B) may be used to both drive and synchronize the rotation of one or more of the line starwheels, e.g., the head pulley 162 and the tail pulley 164. In servo-driven systems, a two-point electronic interface with the machine drive is implemented. In the embodiment of FIG. 1B, for example, an encoder 169 is attached to an output shaft 167 at an intermediate infeed or an intermediate discharge. As such, the adjacent turrets and transfer starwheels do not have a physical connection but, rather, communicate via electronic means to ensure that they function in sync with one another. Servo-driven systems generally self-compensate for variable backlash of the machine drive. In some embodiments, sprocket system tensioners provide takeup of backlash variance. The machine may be synchronized by digital timing of the starwheels at the intermediate infeed and intermediate discharge.

In some aspects, the conveyor 166 may be driven by a pulley disposed on the working side 166a and/or the return side 166b of the conveyor 166. It is contemplated that the conveyor 166 may be used as the synchronization mechanism, for example, on shorter systems or systems that are designed to allow for slight variability in timing.

The takeup mechanism 168 tensions the conveyor 166 and may adjust the linear distance traveled by the working side 166a of the conveyor 166. This can be used to compensate for length or pitch variance due to temperature variations, manufacturing tolerances, lot-to-lot variability, section-to-section differences, wear, chain-tension stretch, any combination thereof, or the like. In the illustrated embodiment, the takeup mechanism 168 is a dual takeup mechanism where the first takeup idler 168a tensions the working side 166a of the conveyor 166 and the second takeup idler 168b tensions the return side 166b of the conveyor 166. In some embodiments, the takeup idlers 168a,b move linearly to tension the conveyor 166 (e.g., moving upward or downward in the illustrated embodiment). In some embodiments, the takeup idlers 168a,b are mounted to pivot about an axis to tension the conveyor 166. For example, takeup idler 168a can be disposed at a first end of an arm distal a pivot axis. As the arm and takeup idler 168a pivot about the axis, the takeup idler 168a adjusts the linear distance traveled by the conveyor 166 so as to increase or decrease tension on the conveyor 166. It is contemplated that the takeup mechanism 168 may be achieved with fewer or more than the illustrated number of pulleys or sprockets. For example, the recirculation line 106 can include only four pulleys, only six pulleys, or any other suitable number of pulleys.

When the line starwheels 104 are disposed in a generally straight-line arrangement and the recirculation line 106 transfers the articles 110 at the same relative orientation on the upstream and downstream line starwheels 104u,d, the recirculation line 106 must phase shift the articles 110. That is, the working side 166a of the conveyor 166 must travel a linear distance such that a line pocket 172a-d of a first line-pocket set 170 deposits an n-pass article 110 in the upstream line starwheel 104u while a line-pocket 172a-d of a second line-pocket set 170 receives an m-pass article 110 from the downstream line starwheels 104, where m=n+1. One example of such phase shifting is described in U.S. Patent Application Publication No. 2016/0361750, which is incorporated by reference herein in its entirety. For example, the first line pocket 172a of a line-pocket set 170 disposed at the head pulley 162 deposits a first-pass article 112a in the second-pass starwheel pocket 140 of the upstream line starwheel 104u contemporaneously with the second line pocket 172b of a line-pocket set 170 disposed at the tail pulley 164 receiving a second-pass article 112b from the downstream line starwheel 104d. Beneficially, the takeup mechanism 168 can be used to dynamically adjust the distance traveled by the working side 166a of the conveyor 166. Such a dynamic adjustment can be used to compensate for stretching that may occur due to, e.g., heating or normal wear of the conveyor 166 or other inconsistencies in conveyor pitch distance, while maintaining the synchronization of the recirculation line 106 with the plurality of line starwheels 104.

Referring now to FIG. 2, a portion of the plurality of line starwheels 104 is illustrated. In the illustrated embodiment, each of the plurality of line starwheels 104 includes ten pockets 140 thereon. However, it is contemplated that the line starwheels 104 may include any suitable number of pockets. Each of the ten starwheel pockets 140 is configured to receive an article 110 at a predetermined stage of manufacture. In the illustrated example, the plurality of line starwheels 104 is configured to receive articles at five different stages of manufacture. As used herein, the articles 110 passing through the plurality of line starwheels 104 a first time are referred to as first-pass articles 112a, the articles 110 on a first recirculation and passing through the plurality of line starwheels 104 a second time and are referred to second-pass articles 112b, the articles 110 on a second recirculation and passing through the line starwheels 104 a third time are referred to as third-pass articles 112c, etc.

When passed through the plurality of line starwheels 104, all first-pass articles 112a will contact a first predetermined pocket of each line starwheel 104, all second-pass articles 112b will contact a second predetermined pocket of each line starwheel 104, all third-pass articles 112c will contact a third predetermined pocket of each line starwheel 104, all fourth-pass articles 112d will contact a fourth predetermined pocket of each line starwheel 104, and all fifth-pass articles 112e will contact a fifth predetermined pocket of each line starwheel 104. Because each line starwheel 104 of the illustrated embodiment includes ten starwheel pockets 140, each line starwheel 104 includes two pockets to receive articles from a respective pass. The two pockets for each respective pass are disposed generally opposite one another.

The illustrated portion of the plurality of line starwheels 104 of FIG. 2 includes forming starwheels 202a,b and transfer starwheels 204a-c disposed in a linear, alternating arrangement. Each of the line starwheels 104 rotates about a respective central axis. As illustrated by directional Arrows D, adjacent line starwheels 104 in the plurality of starwheels counter rotate. The transfer starwheels 204a-c are configured to load, unload, and pass the articles 110 downstream without performing a modifying operation.

The forming starwheels 202a,b are disposed on a forming turret (not shown). The forming turret may perform any suitable type of forming operation or process on the articles 110. For example, the forming turret may perform a necking, curling, trimming, threading, expanding, heating, or any other suitable type of operation. Adjacent starwheel pockets 140 of a forming starwheel 202a,b may perform different operations. For example, an article 110 in a first starwheel pocket 140 of the forming starwheel 202a,b may undergo a necking step while an article 110 in a second starwheel pocket 140 of the forming starwheel 202, adjacent the first starwheel pocket 140, may undergo an expanding step. Additionally, one or more starwheel pockets 140 of the forming starwheels 202a,b may be configured to transfer the article 110 without performing a modifying operation on the article 110.

During operation, the first transfer starwheel 204a loads the articles 110 into the first forming starwheel 202a that is adjacent to and downstream from the first transfer starwheel 204a. The first forming starwheel 202a then performs a forming operation on the articles 110 while continually rotating. The forming operation is completed within a working angle of the forming starwheel. In the illustrated example, the working angle of the first forming starwheel 202a is 180°, or one-half revolution of the first forming starwheel 202a. It is contemplated that other working angles may be used. A second transfer starwheel 204b that is adjacent to and downstream from the first forming starwheel 202a then unloads the articles 110 from the first forming starwheel 202a. The second transfer starwheel 204b then transfers the articles 110 to the second forming starwheel 202b that is adjacent to and downstream from the second transfer starwheel 204b. The second forming starwheel 202b then performs an additional forming operation on the articles 110 while continually rotating. A third transfer starwheel 204c that is adjacent to and downstream from the second forming starwheel 202b then unloads the article 110 from the second forming starwheel 202b and passes the article 110 downstream to be recirculated and/or to have further forming operations performed.

By way of example, the passage of a single article 110 through the system 100 will be described. FIGS. 3a-3b illustrates an expanded view of the interfaces between the plurality of line starwheels 104 and the recirculation line 106 within the system 100. The infeed starwheel 102 engages a preform article 312 and feeds the preform article 312 into a first-pass starwheel pocket 140 of the upstream line starwheel 104u of the plurality of line starwheels 104. In the illustrated example, the upstream line starwheel 104u is a transfer starwheel 204. The preform article 312 is then passed between the corresponding first-pass starwheel pocket 140 of each of the plurality of line starwheels 104. At least one of the first-pass pockets 140 of the line starwheels 104 applies a forming operation such as necking, expanding, trimming, etc. to form a first-pass article 112a. After reaching a downstream line starwheel 104d, the first-pass article 112a is received by the first line pocket 172a. The first-pass article 112a is then transported along the working side 166a of the conveyor 166 and phase shifted so that the first-pass article 112a is deposited in a second-pass starwheel pocket 140 of the upstream line starwheel 104u for a first recirculation. This process continues until the article is recirculated through each of the third-pass, fourth-pass, and fifth-pass starwheel pocket to undergo respective further forming or processing operations. The resulting fifth-pass article 112e is received by the outfeed starwheel 108 after reaching the downstream line starwheel 104d. The outfeed starwheel 108 then passes the fifth-pass articles 112e to downstream processes for further modification or packaging. It should be noted, however, that the number of passes contemplated herein is not limited to five, and any suitable number of passes may be used.

The first takeup idler 168a and the second takeup idler 168b of the system 100 allow for modularity of the recirculation line 106. That is, the line starwheels 104 between the upstream line starwheel 104u and the downstream line starwheel 104d can be housed within a plurality of modular units. When modules are added to or removed from the system 100, sections of conveyor 166 equal to about twice the module width will generally be added or removed from the recirculation line 106. The first takeup idler 168a and the second takeup idler 168b can then be adjusted to accommodate for the addition or subtraction of these modular units to the system 100 while maintaining the proper synchronization and phase shift. This configurability benefits users by reducing the cost and time associated with system modification. Additionally, this configurability benefits the manufacturer by reducing the amount of different parts needed to provide a variety of systems. It is contemplated that the first takeup idler 168a and the second takeup idler 168b can be configured to accommodate for the addition or subtraction of at least one modular unit without the need to add or remove sections of the conveyor 166.

Figure 4A:
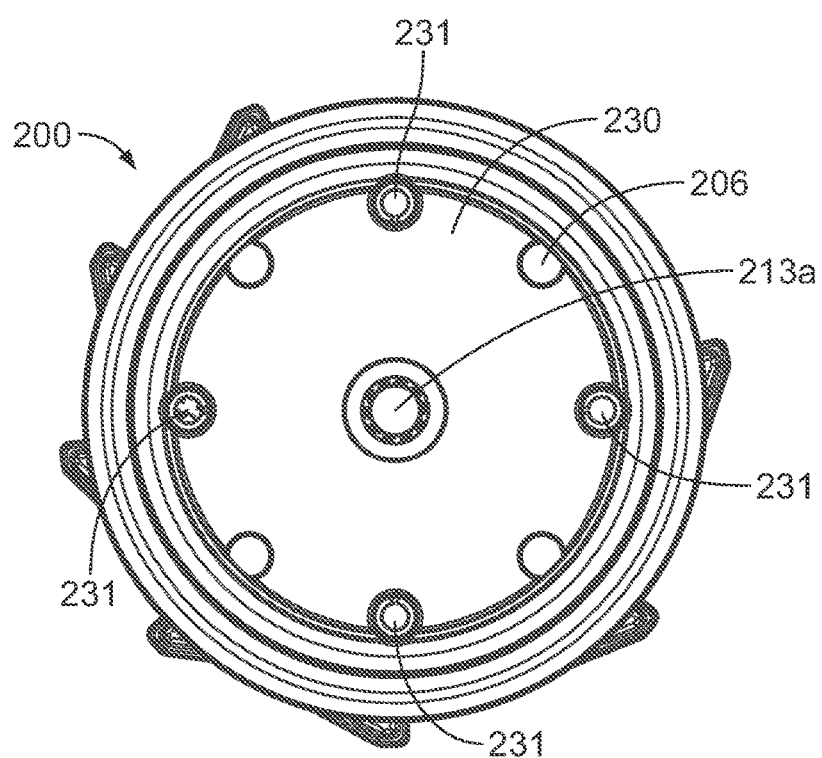
FIG. 4a is a top view of a gripper device according to one embodiment of the present disclosure.
Figure 4B:
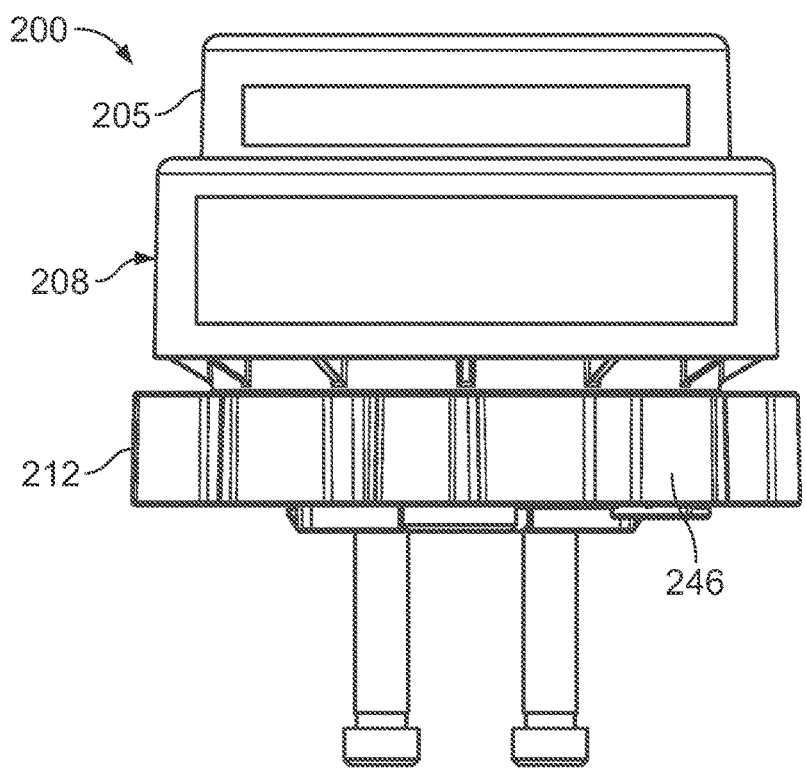
FIG. 4b is a side view of the gripper device of FIG. 4a in an extended position.
Figure 4C:
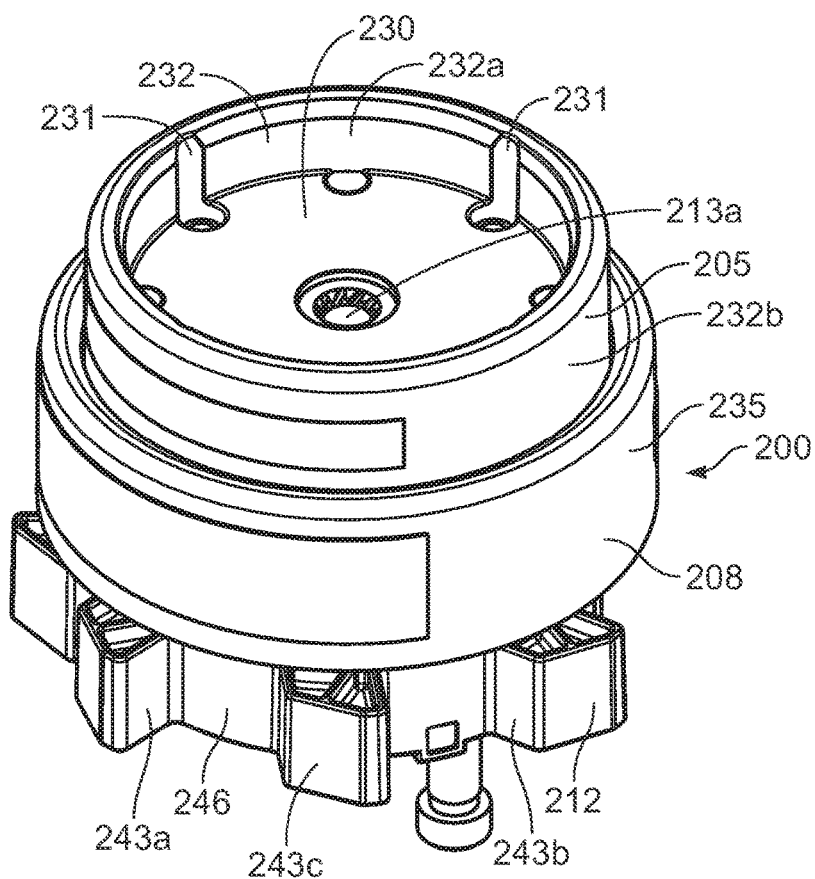
FIG. 4c is a perspective top view of the gripper device of FIGS. 4a, 4b in the extended position.
Figure 4D:
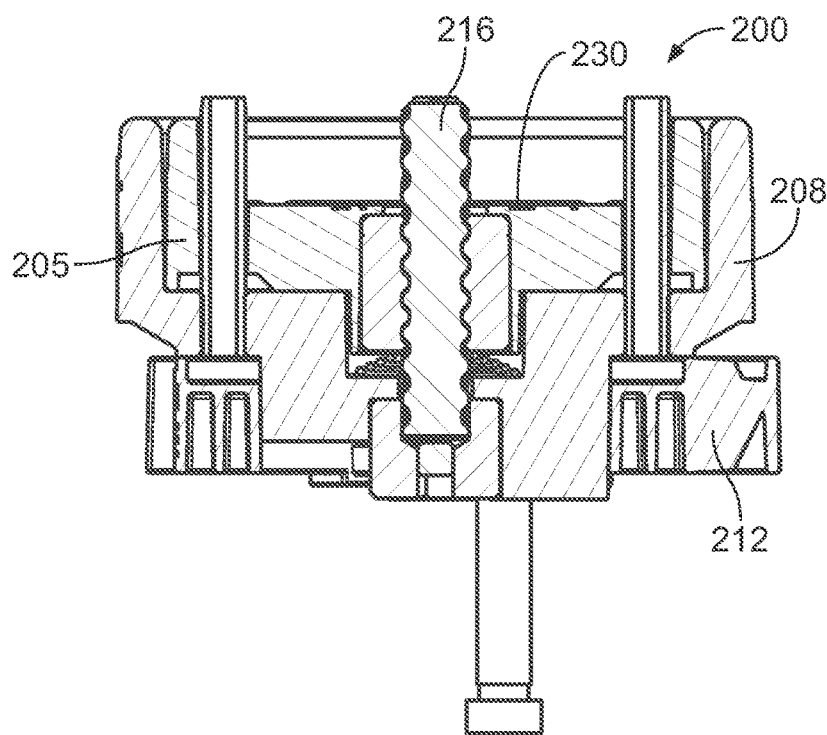
FIG. 4d is a cross-sectional side view of the gripper device of FIGS. 4a-4c in a retracted position.
Figure 4E:
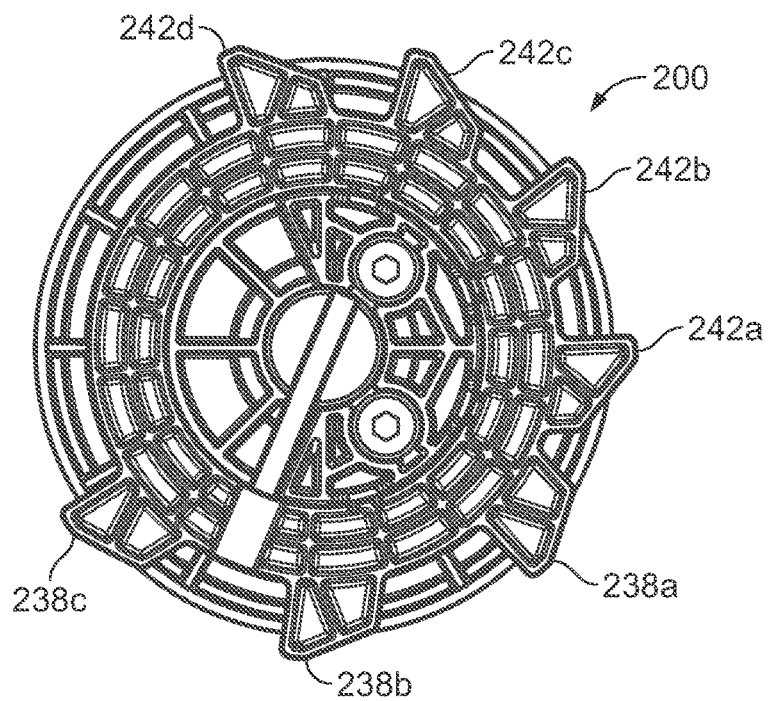
FIG. 4e is a bottom view of the gripper device of FIGS. 4a-4d in the retracted position.
Figure 4F:
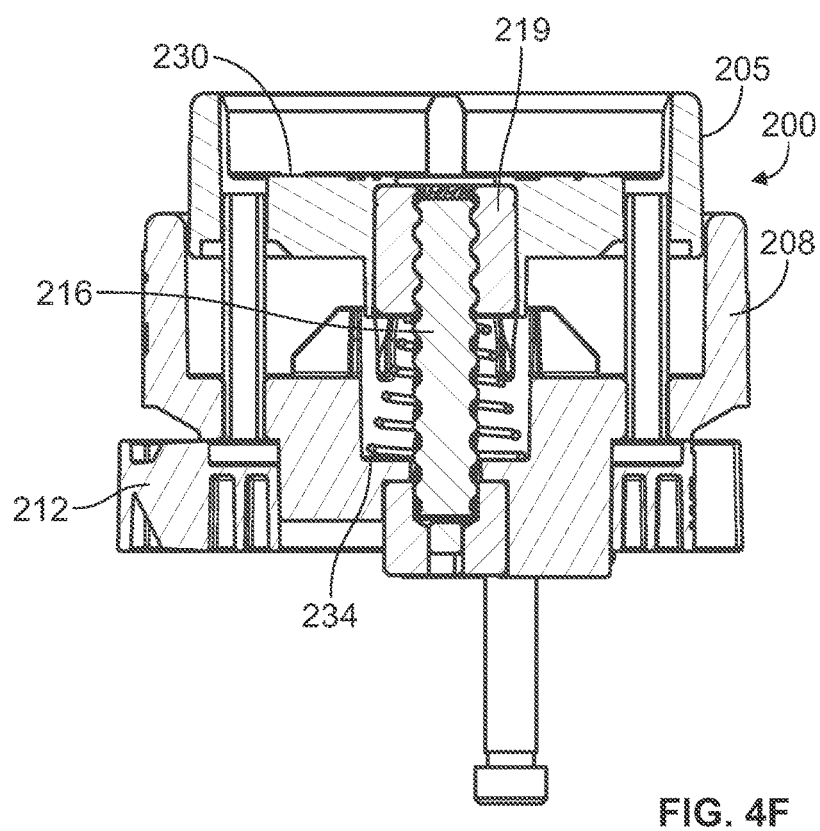
FIG. 4f is a cross-sectional side view of the gripper device of FIGS. 4a-4e in an extended position.
Figure 4G:
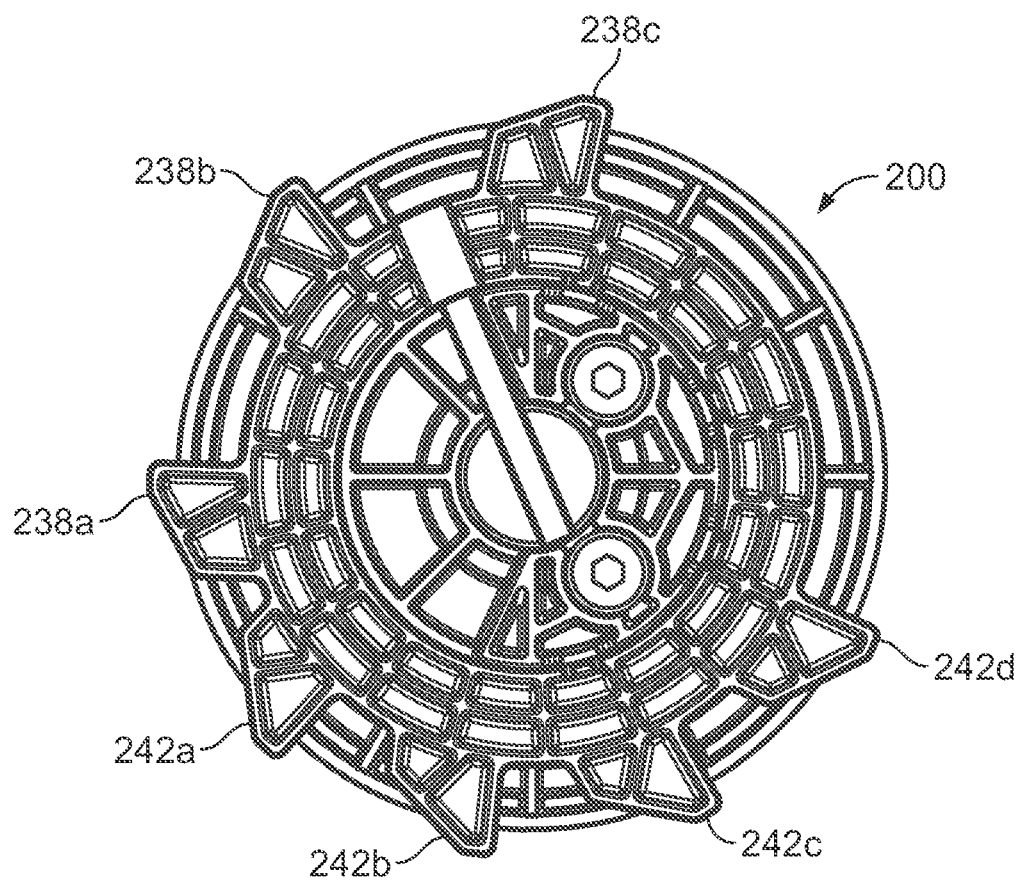
FIG. 4g is a bottom view of the gripper device of FIGS. 4a-4f in the extended position.
Figure 4H:
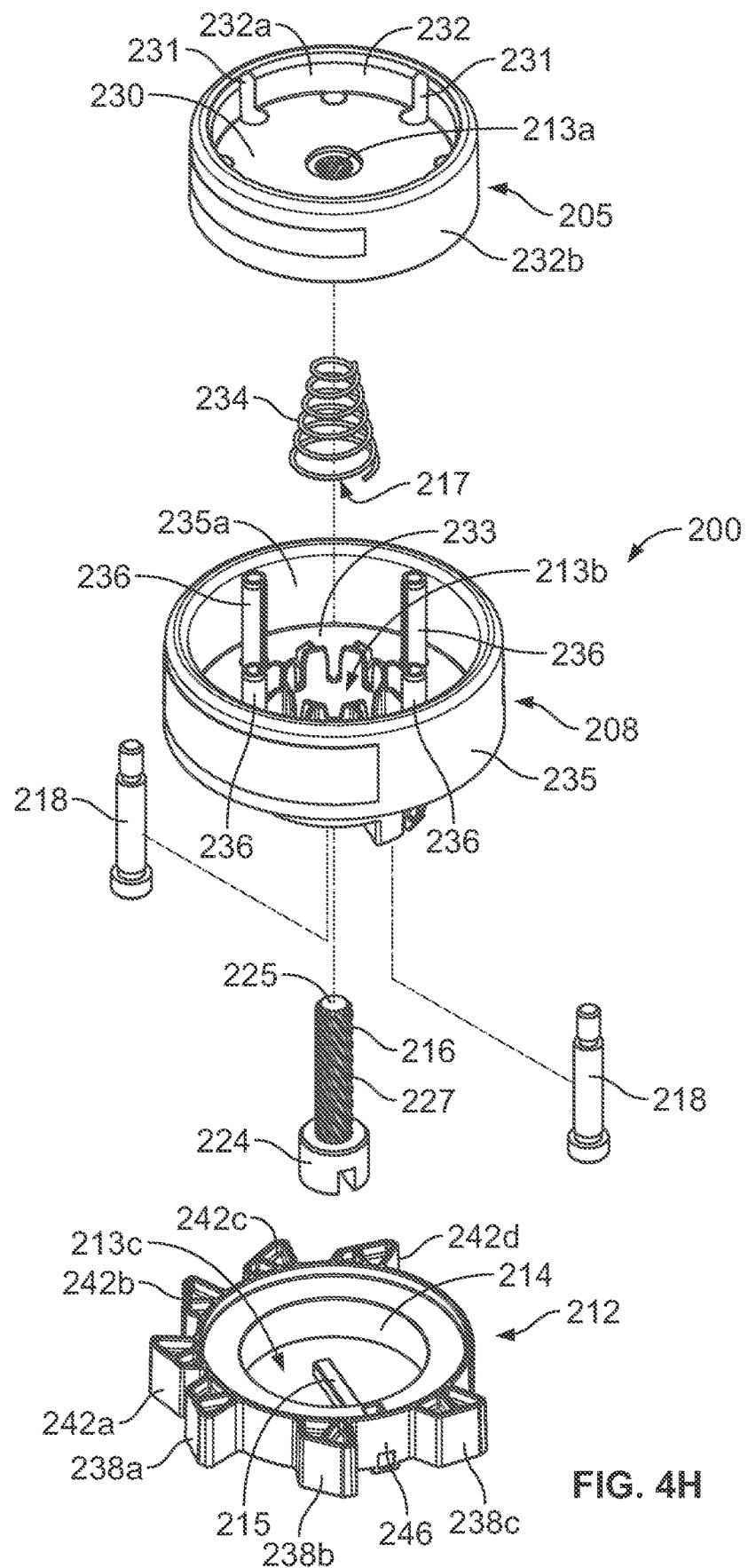
FIG. 4h is an exploded view of the gripper device of FIGS. 4a-4g.
Figure 5:
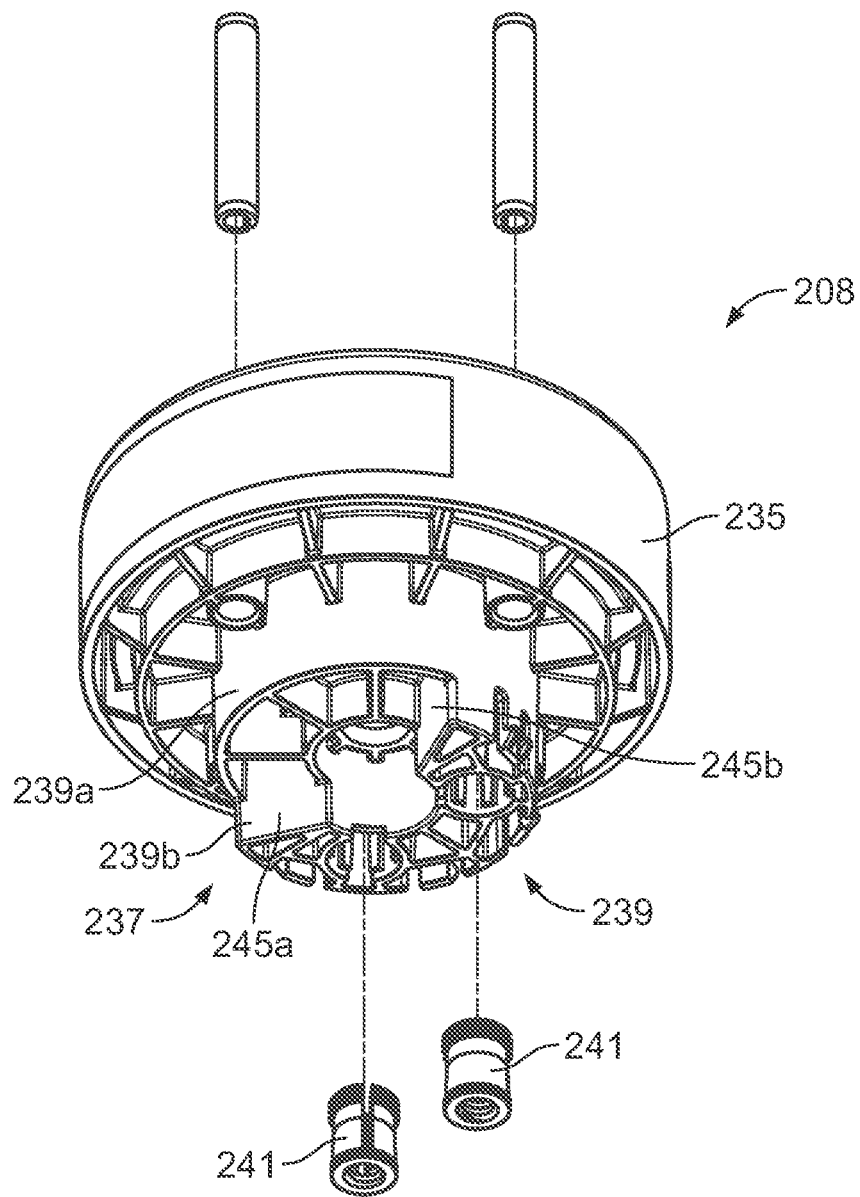
FIG. 5 is an exploded view of a top portion of a gripper device according to one embodiment.

Referring now to FIGS. 4-5, a gripper device 200 for securing and transporting articles 110 through a multi-pass process (such as the one shown in FIGS. 1-3 and described herein) is shown. As described above, multi-pass recirculation requires that pocket correlation be maintained throughout the entire process. As such, an article extracted from, e.g., a necking flow stage n from pocket p must be reintroduced into the necking flow at stage n+1 into pocket p+1.

Referring to FIGS. 4a-4h, a gripper device 200 is shown according to one embodiment. The gripper device 200 includes a top portion 205 for contacting (and holding/releasing) a closed end of an article 110, a hub portion 208, an optional resilient device (e.g., a spring) 217 positioned between the top portion 205 and the hub portion 208, a pronged paddle wheel 212, and a drive screw 216. The top portion 205, the hub portion 208, and the pronged paddle wheel 212 are generally circular and include respective generally central apertures 213a, 213b, 213c therethrough for receiving the drive screw 216. The central aperture 213a of the top portion 205 includes a drive nut 219 mounted therein or integral therewith (see FIG. 4f) configured to mate with a threaded portion of the drive screw 216 (as explained in more detail below).

The top portion 205 further includes a contact surface 230 for contacting a closed end of the article 110 and a rim 232 extending from the perimeter of the contact surface 230 in an axial direction. An inner surface 232a of the rim 232 is configured to surround the sidewall of the article 110. Various mechanisms may be used for securing the article 110 to the top portion 205 including, but not limited to, magnets 206 positioned on or within the top portion 205 (which may be useful for magnetic metal articles), cam actuated fingers, friction between the article 110 and the rim 232, vacuum, combinations thereof, or the like. The top portion 205 also includes a plurality of apertures 231 (see FIGS. 4a, 4c, 4h) extending from a bottom surface (not shown) to the contact surface 230. In the illustrated embodiment, the plurality of apertures 231 is generally positioned along the perimeter of the top portion 205. However, it is contemplated that the plurality of apertures may be positioned on/in other suitable locations on the top portion 205.

The hub portion 208 of the gripper device 200 includes a top surface 233 and a wall 235 extending from the perimeter of the top surface 230 in an axial direction. The hub portion 208 has an inner diameter that is slightly larger than the outer diameter of the top portion 205 so that the top portion 205 may be received by the hub portion 208 such that an outer surface 232b of the rim 232 is adjacent to or generally abuts an inner surface 235a of the wall 235. The hub portion 208 further includes a plurality of ejection pins 236 extending upwardly from the top surface 233 in an axial direction. Each of the ejection pins 236 is configured to be received by a respective one of the plurality of apertures 231 for slidably coupling the top portion 205 to the hub portion 208 for axial translation motion. Thus, the top portion 205 is axially movable and generally radially fixed with respect to the hub portion 208.

According to one embodiment, a bottom 237 of the hub portion 208 includes an extension 239 projecting therefrom, as shown, for example, in FIG. 5. The extension 239 includes a generally ring-shaped portion 239a having a smaller diameter than the wall 235 and a generally arc-shaped portion 239b extending from the ring-shaped portion 239a. The extension 239 is rotatably coupled to the paddle wheel 212 such that the axial position—but not the rotational position—of the hub portion 208 is generally fixed with respect to the paddle wheel 212. As such, the paddle wheel 212 is generally axially fixed and rotatable with respect to the hub portion 208. In some embodiments, "fishhook-style" flexible retention tabs may be used to axially fix the hub portion 208 to the paddle wheel 212. It is contemplated that other suitable coupling features may also or alternatively be used.

The arc-shaped portion 239b may include a mounting feature configured to assist with coupling the gripper device 200 to the conveyer 166 of a recirculation line (as described in more detail below). In the illustrated embodiment, the mounting feature includes threaded apertures 241 configured to mate with a threaded portion of a respective pin 218, where the pin 218 likewise extends through an aperture in the conveyer 166. It is contemplated that other mounting features may be used and/or that a different amount of mounting features (e.g., more or less than two) may be used.

The paddle wheel 212 has a post 215 projecting radially inward from an inner surface 214 of the sidewall of the paddle wheel 212 through an aperture 213c toward the center of the paddle wheel 212. The length of the post 215 should be such that the arc-shaped portion 239b does not interfere therewith. Namely, as shown in FIGS. 4d and 4f, when the paddle wheel 212 is coupled to the hub portion 208, an outer wall of the extension 239 abuts or is adjacent to the inner surface 214 of the paddle wheel 212 and top surface of the post 215 abuts or is adjacent to a bottom of the ring-shaped portion 239a. A first side of the post 215 is configured to be adjacent to a first end 245a of the arc-shaped portion 239b when the paddle wheel 212 is rotated in a first direction relative to the hub portion 208, and a second opposing side of the post 215 is configured to be adjacent to a second opposing end 245b of the arc-shaped portion 239b when the paddle wheel 212 is rotated in a second direction relative to the hub portion 212. Thus, the paddle wheel 212 is rotationally coupled to the extension 239 of the hub portion 208, the rotational movement being limited by the post 215 contacting the ends 245a, 245b of the arc-shaped portion 239b.

The paddle wheel 212 further includes a plurality of retract prongs 238a-238c and a plurality of extend prongs 242a-242d that extend radially outward from a side wall 246 of the paddle wheel 212 and that are offset in generally opposing directions. Referring to the non-limiting embodiment illustrated, for example, each of the prongs include a longer side 243a, a shorter side 243b, and a sloped portion bridging the longer side 243a with the shorter side 243b (see FIG. 4c). The extend prongs 242a-242d and the retract prongs 238a-238c are essentially mirror images of one another, e.g., the longer side 243a is the left side of the extend prongs 242a-242d, and the longer side 243a is the right side of the retract prongs 238a-238c (or vice versa). Each of the plurality of retract prongs 238a-238c and extend prongs 242a-242d are positioned over a prescribed range of the circumference of the paddle wheel 212. Although the illustrated embodiment includes three retract prongs 238a-238c and four extend prongs 242a-242d, it is contemplated that the paddle wheel 212 may include any suitable number of retract prongs and/or extend prongs. In the non-limiting embodiment shown, the circumferential line of action for the retract prongs 238a-238c is different than the circumferential line of action for the extend prongs 242a-242d. The rate of angular action is less for the extend prongs 242a-242d, thereby necessitating an additional prong (i.e., 242d) to accomplish equal axial displacement of the top portion 205 during retraction and extension.

The drive screw 216 includes a head portion 224 positioned generally opposite a distal end 225 and threads 227 along a sidewall extending from the head portion 224 to the distal end 225 (or some portion thereof). In the illustrated embodiment, the head portion 224 includes a slot 226 configured to engage the post 215 of the paddle wheel 212. It is contemplated, however, that the drive screw 216 may be coupled to the paddle wheel 212 using any suitable mechanism.

As discussed above, the distal end 225 of the drive screw 216 is configured to be received through the respective apertures 213a,b,c of the top portion 205, hub portion 208, and paddle wheel 212 and to engage the drive nut 219 of the top portion 205. In the illustrated embodiment, the drive screw 216 is also configured to be received through a generally central aperture 217 of the resilient device 234 (see FIG. 4h). As the drive screw 216 rotates (via rotation of the paddle wheel 212 to which it is coupled), the drive nut 219 is displaced, causing axial movement of the top portion 205 relative to the hub portion 208 and paddle wheel 212 along the cylindrical axis. As such, rotation of the paddle wheel 212/drive screw 216 results in axial movement from a retracted position (see FIG. 4d) to an extended position (see FIG. 4f) and vice versa by converting high speed bi-directional rotary motion to bi-directional axial motion.

When the gripper device 200 is in a retracted position, as shown in FIG. 4d, the optional resilient device 234 is compressed, and the axial distance between the top portion 205 and the hub portion 208 and paddle wheel 212 is decreased. Put another way, in the retracted position, the top portion 205 is received by and at least partially enclosed by the hub portion 208 such that an outer surface 232b of the rim 232 of the top portion 205 generally abuts an inner surface 235a of the wall 235 of the hub portion 208. As the gripper device 200 is compressed into the retracted position, the ejection pins 236 protrude through the respective apertures 231 of the top portion 205, thereby pushing the closed bottom end of the article 110 adjacent to the contact surface 230 of the top portion 205 away from the contact surface 230. As such, the article 110 is released from the top portion 205 and, e.g., sent back into the machine line or recirculation line.

Likewise, when the gripper device 200 is in an extended position, as shown in FIG. 4f, the optional resilient device 234 is generally decompressed (or generally uncompressed), and the axial distance between the top portion 205 and the hub portion 208 and paddle wheel 212 is increased. When the gripper device 200 is in the extended position, the ejection pins 236 generally do not protrude through the apertures 231 of the top portion 205. As such, when in the extended position, the top portion 205 is configured to receive and hold a closed end of an article 110, and the article 110 is not obstructed by the ejection pins 236.

Figure 6:
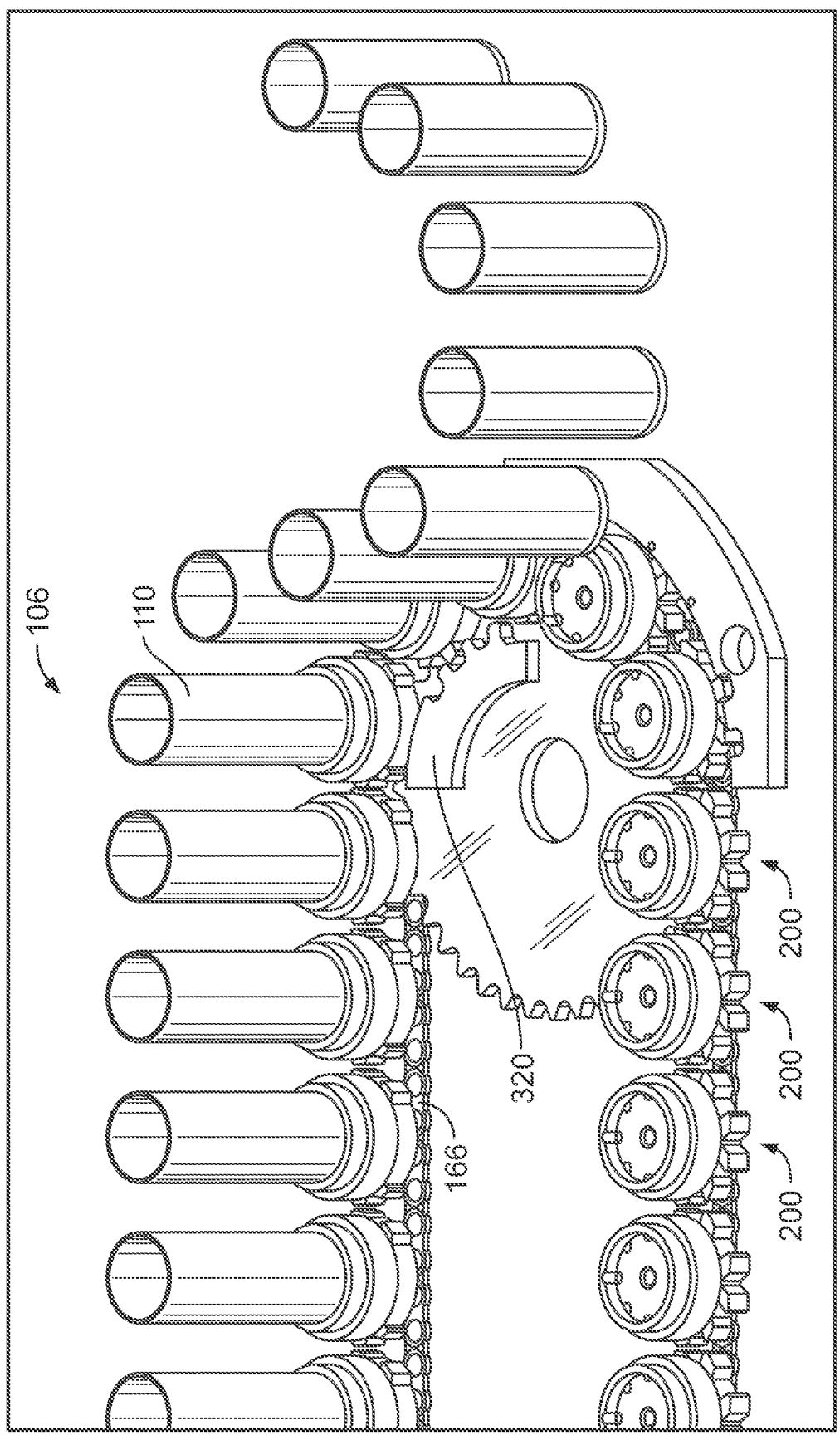
FIG. 6 is a perspective top view of a portion of a recirculation line at the extraction point according to one embodiment.

Referring now to FIGS. 6-8, a plurality of gripper devices 200 is shown in use with a recirculation system for the extraction and re-introduction of an article 110 onto the machine line or recirculation system, according to one non-limiting embodiment. In the illustrated embodiment, each gripper device 200 is coupled to the conveyor 166. At the extraction and re-introduction zones, the gripper device 200 is synchronized with the rotation of the starwheels 202, 204 in the machine line. In some embodiments, the plurality of gripper devices 200 is coupled to the conveyor 166 at regular (or irregular) intervals.

Figure 7A:
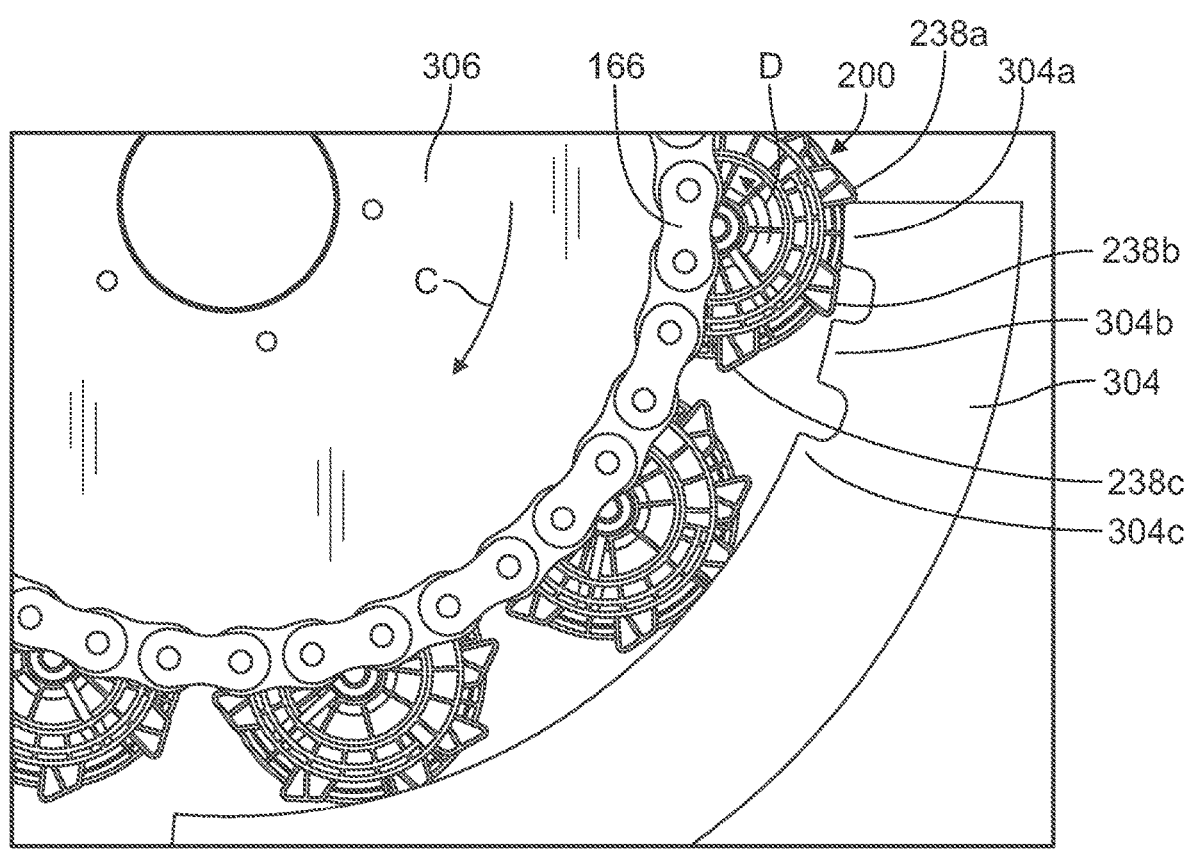
FIGS. 7a-7c illustrate the retraction of a gripper device according to one embodiment.
Figure 7B:
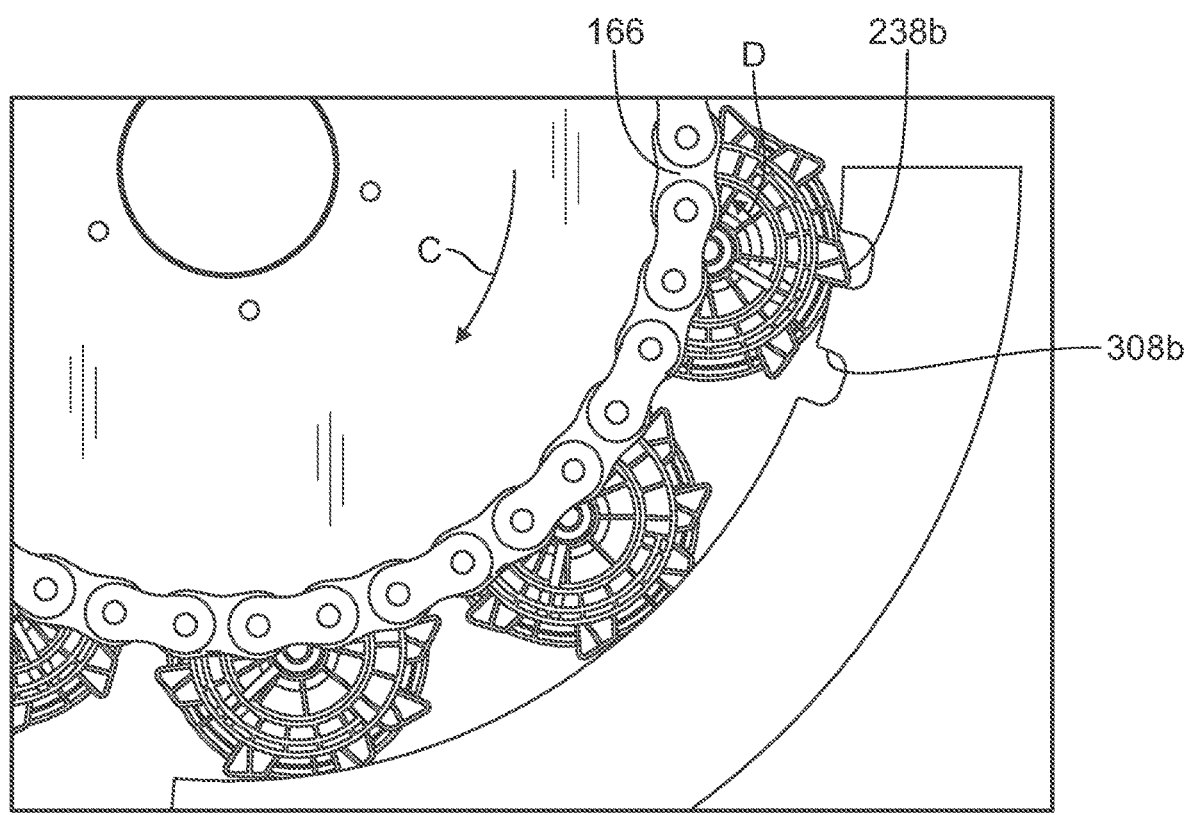
Figure 7C:
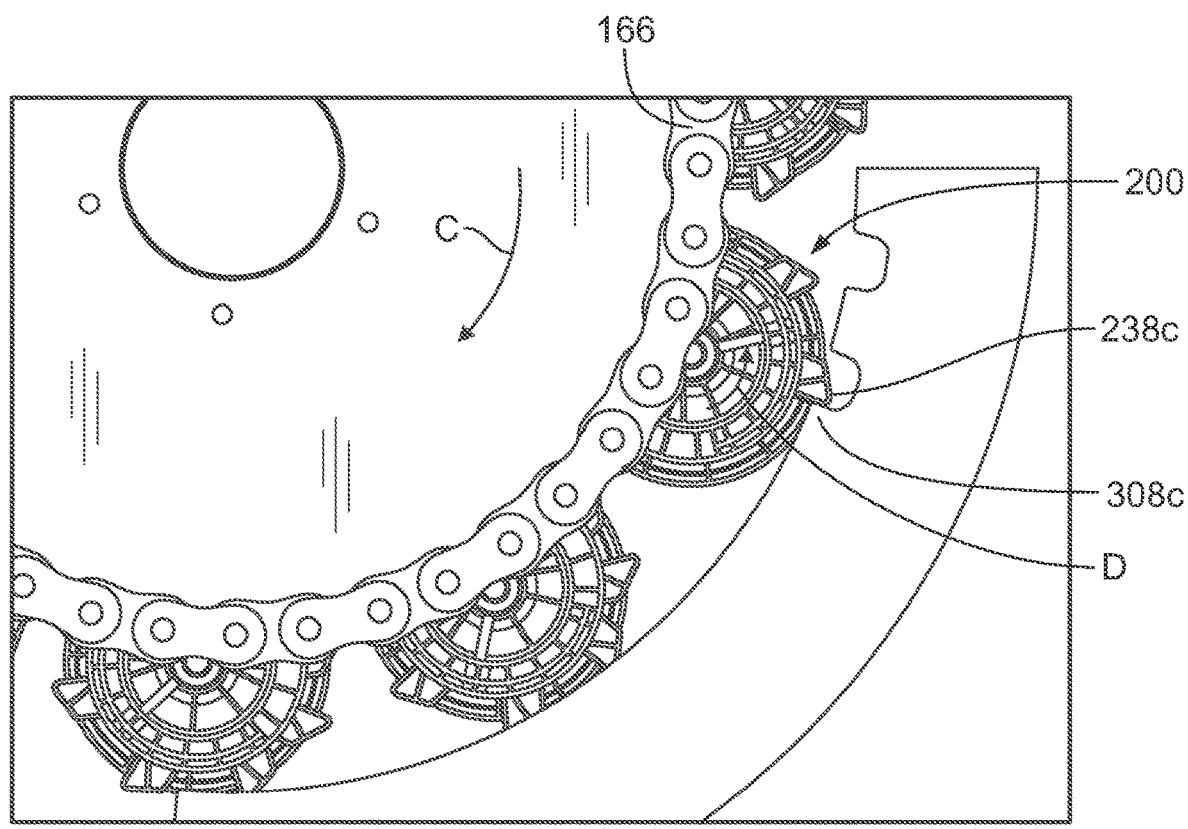
Figure 8A:
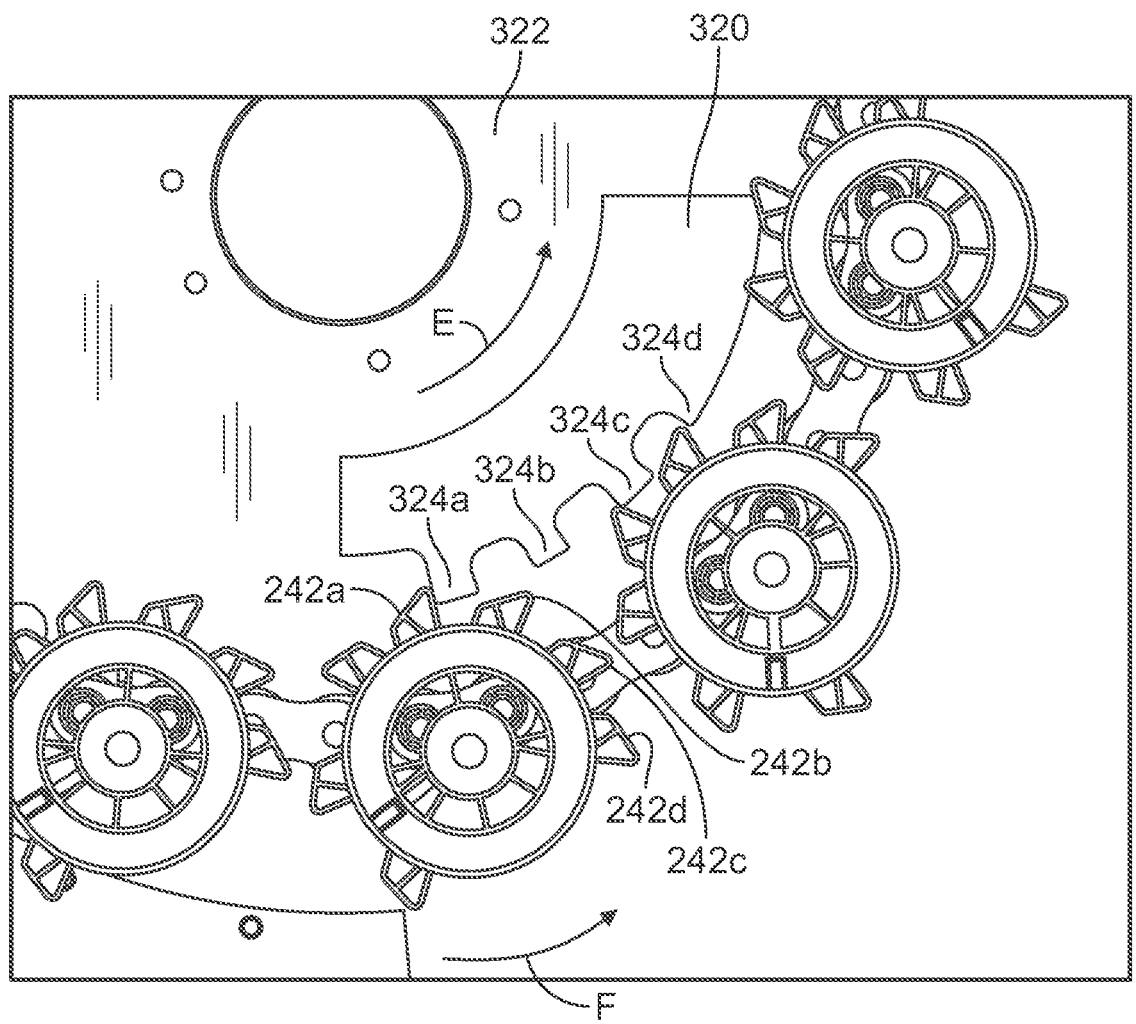
FIGS. 8a-8d illustrate the extension of a gripper device according to one embodiment.
Figure 8B:
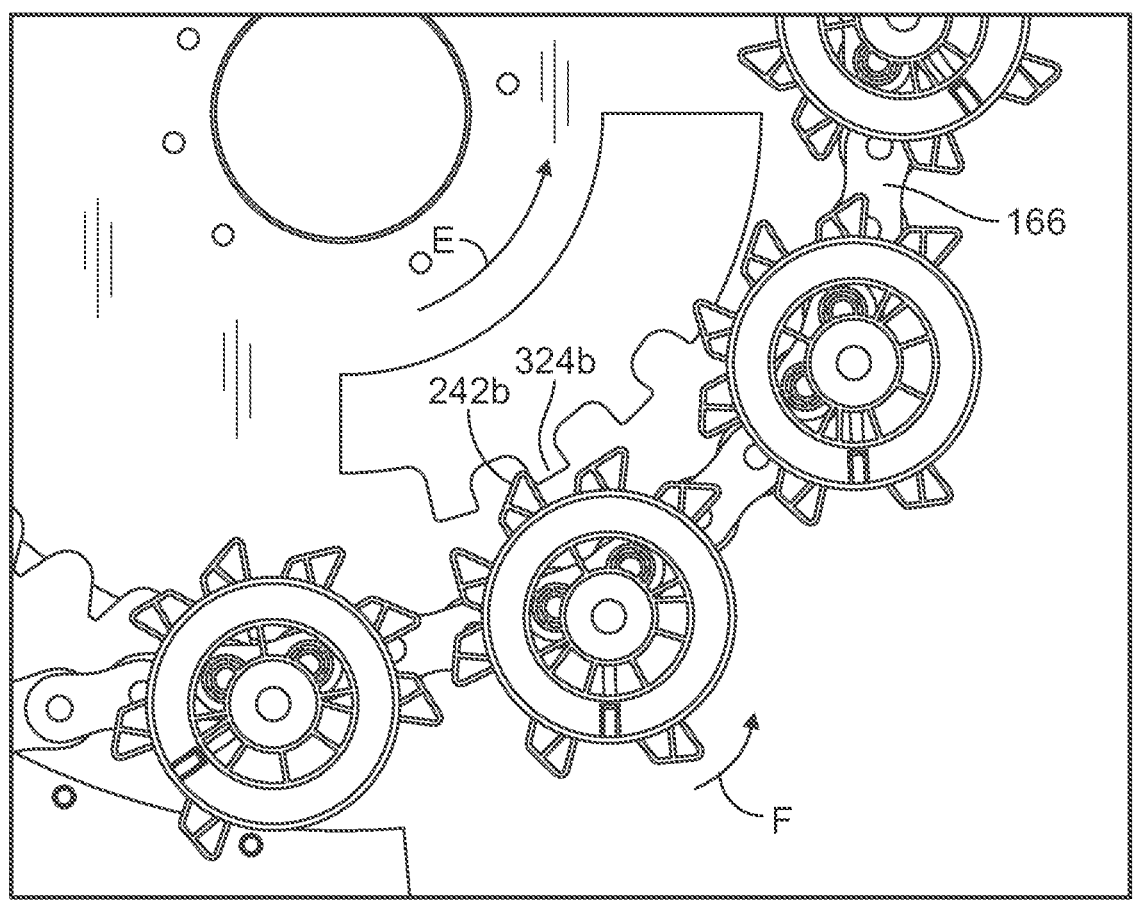
Figure 8C:
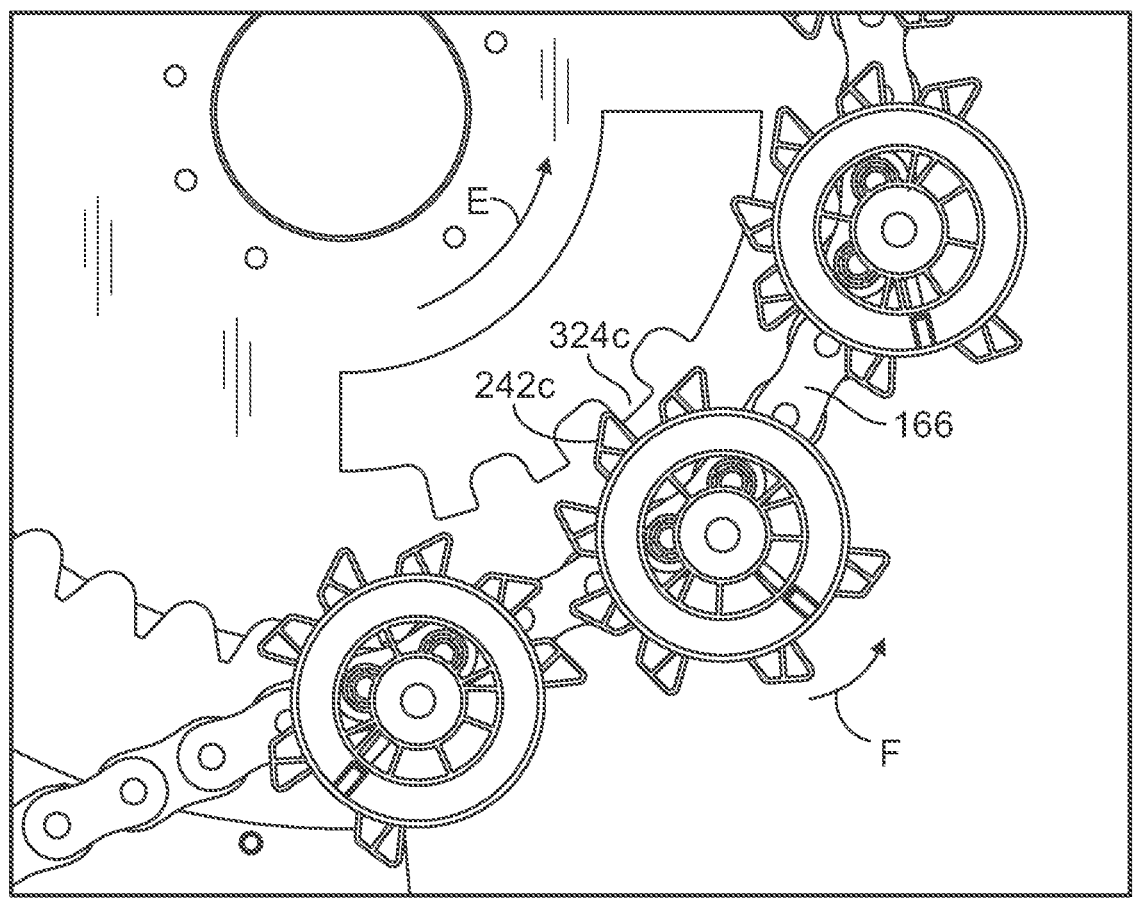
Figure 8D:
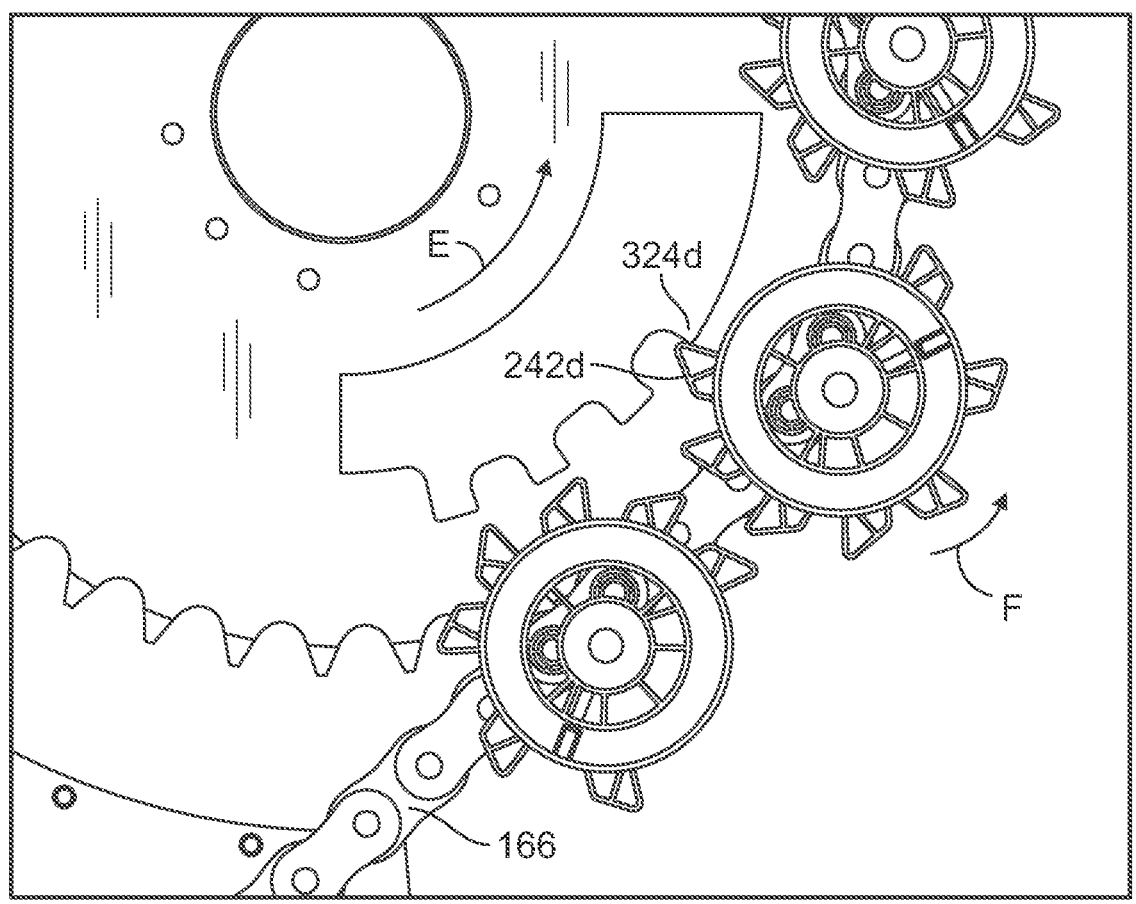

During extraction or re-introduction of the article 110 into the machine line, the gripper device 200 may assume the retracted position (see FIG. 4d) through a 90-degree rotational phase of the starwheel and corresponding sprocket 306 by rotation of the drive screw 216 via engagement of the retract prongs 238a-c with a retract actuator 304 having "teeth" 304a-c extending therefrom (see FIGS. 7a-7c). The retract actuator 304 is in a generally fixed position in the recirculation line and may form a "tunnel" through with the gripper device 200 passes.

In the illustrated embodiment of FIGS. 7a-7c, the sprocket 306 and conveyor 166 coupled thereto move in a clockwise direction of Arrow C. The first retract prong 238a of the gripper device 200 "catches" the first tooth 304a of the retract actuator 304, thereby rotating the paddle wheel 212 and the drive screw 216 coupled thereto in the counterclockwise direction of Arrow D. As the sprocket 306 continues to move in the direction of Arrow C, the second retract prong 238b catches the second tooth 308b, thereby further rotating the paddle wheel 212 and the drive screw 216 coupled thereto in the direction of Arrow D (see FIG. 7b). As the sprocket 306 continues to further move in the direction of Arrow C, the third retract prong 238c catches the third tooth 308c, thereby further rotating the paddle wheel 212 and the drive screw 216 coupled thereto in the direction of Arrow D (see FIG. 7c). The rotation of the drive screw 216 causes the axial movement of the top portion 205 in the downward direction via the engagement of the drive screw 216 with the drive nut 219 coupled to the top portion 205 to the retracted position (see FIG. 4d). Accordingly, the ejection pins 236 extend further and further through the plurality of apertures 231, thereby pushing the closed bottom of the article 110 away from the top portion 205. As such, the article 110 may be reintroduced 110 back into the machine line or recirculation line.

Referring now to FIGS. 8a-d, as the gripper device 200 continues to move along the recirculation line, it is extended through the next 90-degree rotational phase of the starwheel and corresponding sprocket via reverse rotation of the drive screw 216 via the opposing extend prongs 242a-d engaging an extend actuator 320 having a second plurality of teeth 324a-d (see FIGS. 6, 8a-d). In the illustrated embodiment, the sprocket 320 and conveyor 166 coupled thereto move in a counterclockwise direction of Arrow E. The first extend prong 242a catches the first tooth 324a of the extend actuator 320, thereby rotating the paddle wheel 212 and the drive screw 216 coupled thereto in the direction of Arrow F. As the sprocket 322 continues to move in the direction of Arrow F, the second extract prong 242b catches the second tooth 324b, thereby further rotating the paddle wheel 212 and the drive screw 216 coupled thereto in the direction of Arrow F (see FIG. 8b). Further movement of the sprocket 322 causes the third extract prong 242c to catch the third tooth 324c (see FIG. 8c) and, finally, the fourth extract prong 242d to catch the fourth tooth 324d (see FIG. 8d), thereby further rotating the paddle wheel 212 and the drive screw 216 coupled thereto in the direction of Arrow F. The rotation of the drive screw 216 causes the axial movement of the top portion 205 in the upward direction via the engagement of the drive screw 216 with the drive nut 219 coupled to the top portion 205 to an extended position (see FIGS. 4c, 4f). Accordingly, the ejection pins 236 retract further and further out of the plurality of apertures 231. As such, at the end of the extension cycle shown in FIGS. 8a-d, the gripper device 200 is configured to receive an article 110, e.g., the closed end of the article 110 may contact the contact surface 230 of the top portion 205 without being obstructed by the ejection pins 236.

Figure 9A:
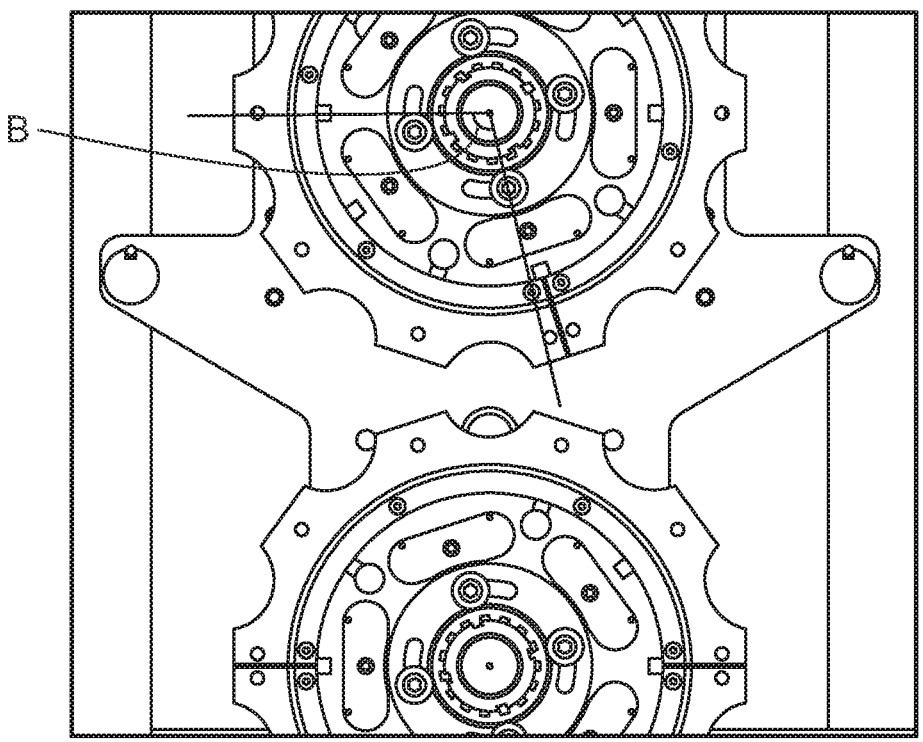
FIG. 9a illustrates a transfer zone of a "chase" type transfer, according to one embodiment.

The 90-degree phased retract followed by the 90-degree phased extend described above provides a gradual, merging, "chase"-type transfer of articles 110 from the machine starwheel to the chain mounted gripper, similar to the passing of a baton between runners during a relay race. As shown, for example, in FIG. 9a, the transfer occurs during an about 100-degree sweep zone. Successful closure of the gripper and accurate orientation of the bottle occurs while traversing through the about 100-degree sweep zone. Timing of the container release from the machine starwheel and full engagement with the gripper also occurs during the about 100-degree tangential sweep zone. When rotating at about 120 rpms, the transfer generally takes about 139 ms. Moreover, with the conveyor 166 configured in a neutral mode with the recirculation system, the article 110 may be extracted from and re-introduced to the forming machine (e.g., the necker) into the same pocket. With the roller configured in a plus one pitch mode, the article 110 will be re-introduced into the necker in the trailing pocket, thereby enabling progressive necking. Such instantaneous bi-directional actuation of the gripper device 200 during transfer of the article 110 to/from the starwheels to/from the recirculation system is unique and provides several advantages. For example, extra time afforded by the "chase" action effects a smoother transfer of the can or bottle to/from the gripper device, thereby reducing the risk of damage to the can or bottle and/or of dropping the can or bottle.

Figure 9B:
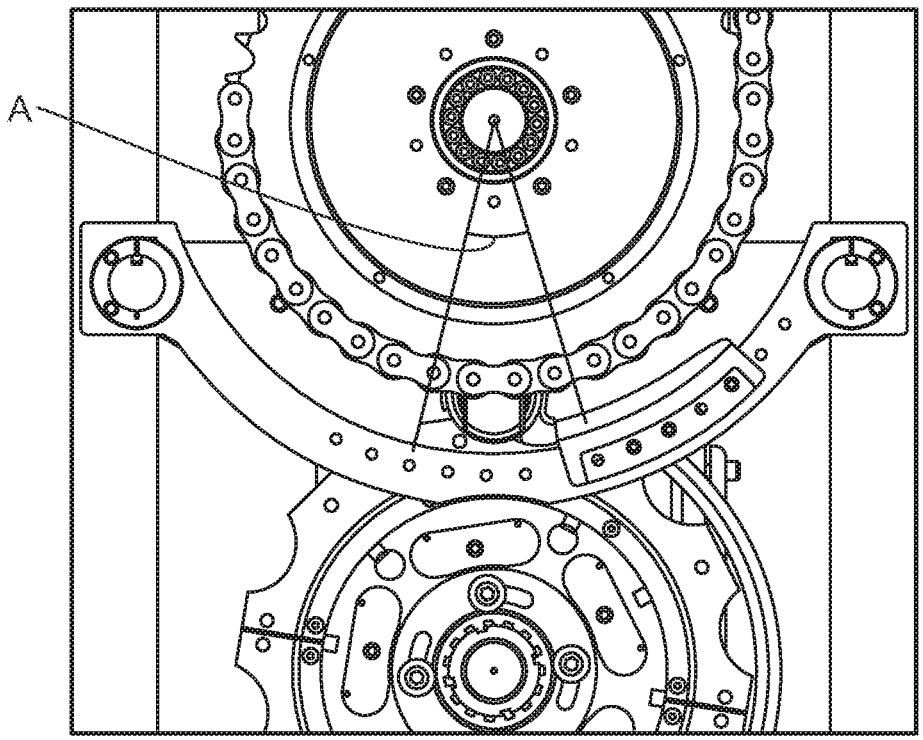
FIG. 9b illustrates a transfer zone of a "pluck" type transfer, according to one embodiment.

Unlike the embodiments described herein, existing "pluck" type methods generally require the full transfer of an article (e.g., from a machine starwheel to a chain mounted gripper) to be accomplished instantaneously as chain position and starwheel pocket pass one another. Total actuation (retraction and extension) cycle time for a "pluck" is approximately one-fourth to one-eighth of the total cycle time of a "chase." As shown in the exemplary illustration of FIG. 9b, in a "pluck" transfer system, transfer occurs at an about 20-degree tangential sweep zone (Angle B) between the machine starwheel pocket and the chain drive sprocket mounter gripper. Successful closure of the gripper and accurate orientation of the container must occur while traversing through the about 20-degree tangential sweep zone. Timing of the container release from the machine starwheel and full engagement with the gripper must also occur during the about 20-degree tangential sweep zone. When rotating at about 120 rpms, the transfer generally takes about 28 ms.

Additional, non-limiting gripper device embodiments in accordance with the present disclosure are shown in FIGS. 10-16. FIGS. 10-12 illustrate exemplary devices in which three independent "fingers" are active as part of a multi-part mechanism (see FIGS. 10-11) or in which two independent fingers are active as part of a single-part, unitized mechanism (FIGS. 12a-12c). FIGS. 13-14 illustrate exemplary gripper devices.

Figure 10A:
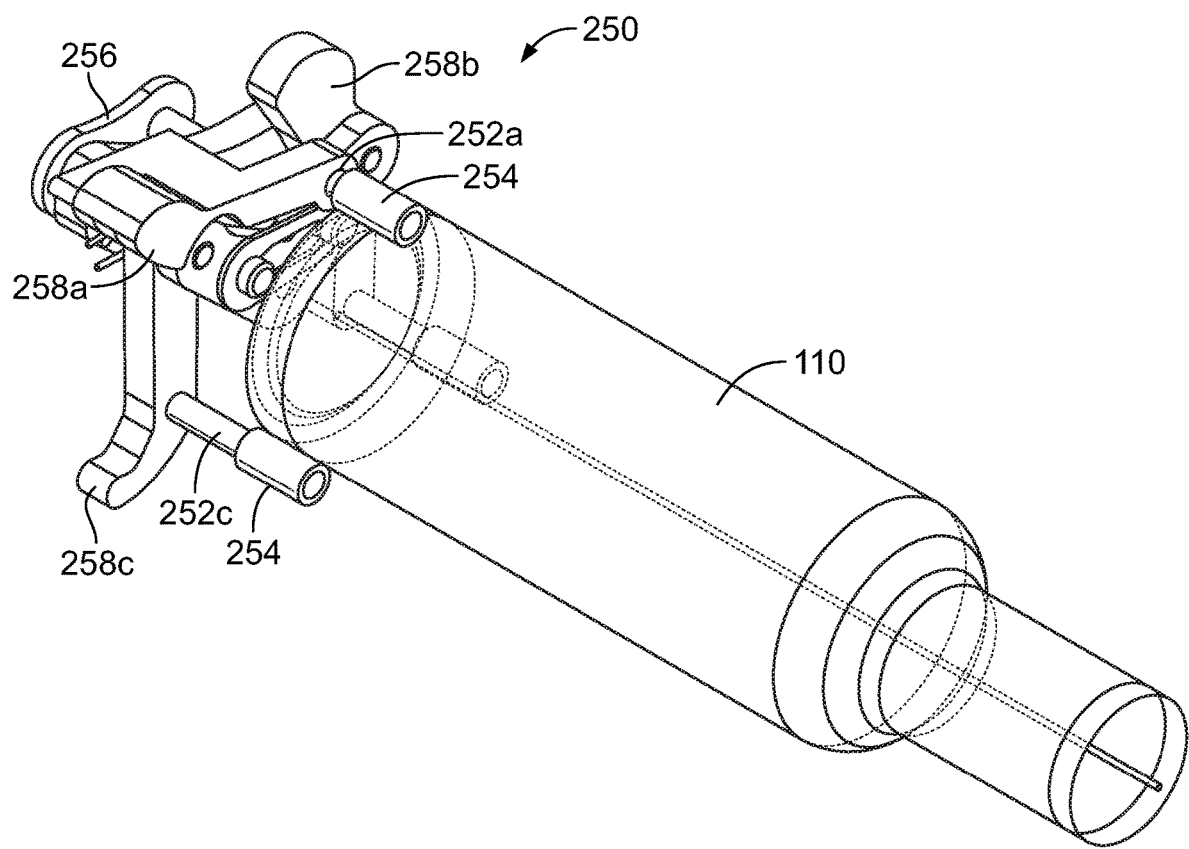
FIG. 10a illustrates a perspective view of a gripper device according to one embodiment.
Figure 10C:
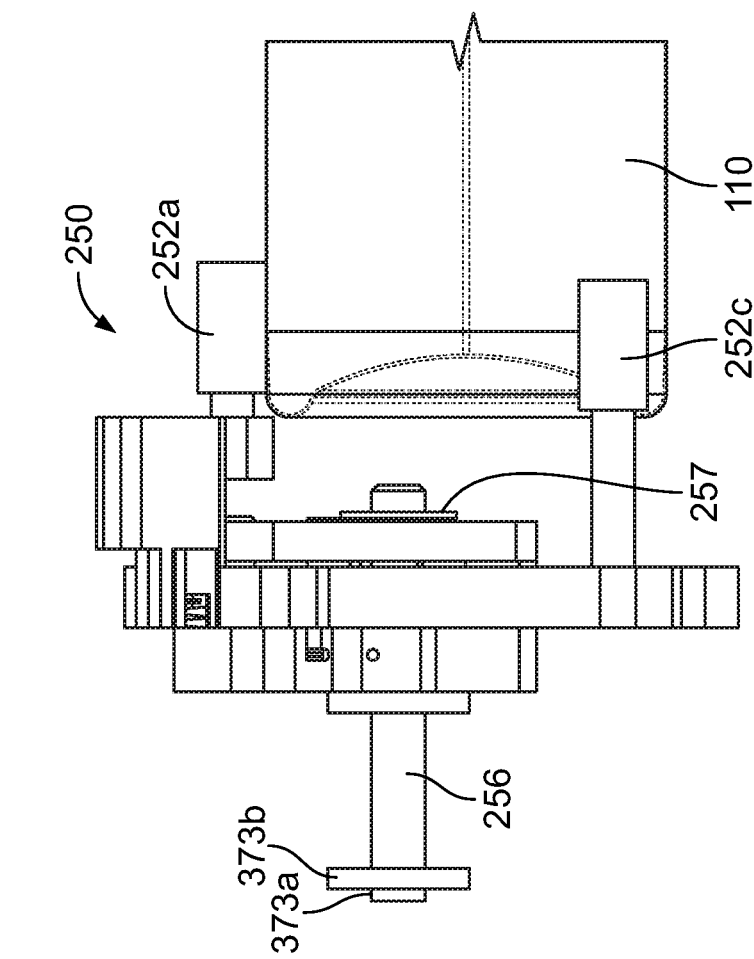
FIG. 10c illustrates a side view of the gripper device of FIGS. 10a, 10b.
Figure 10B:
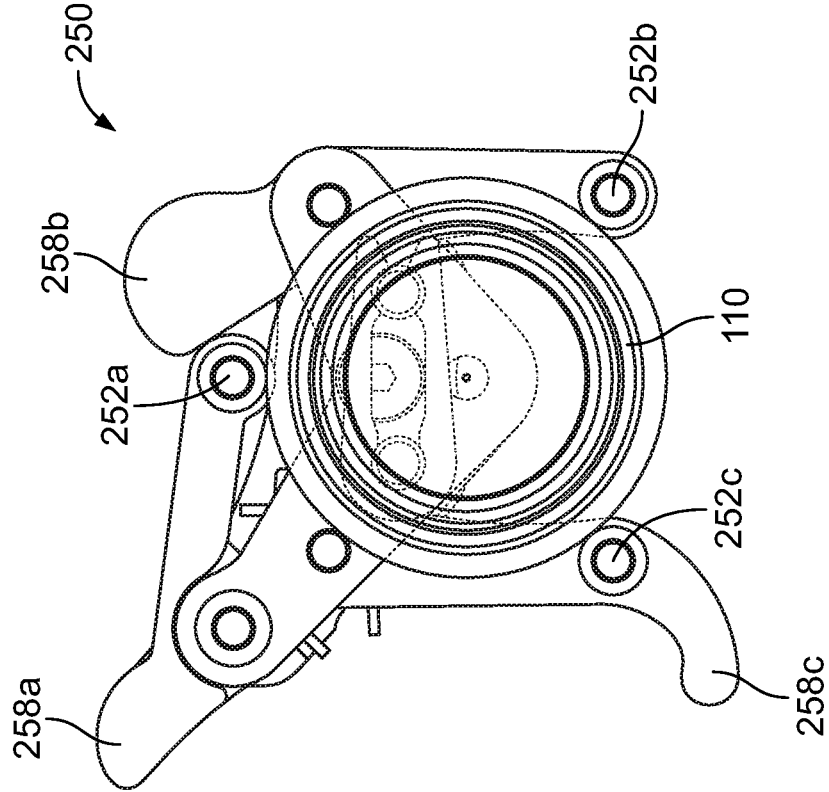
Figure 10D:
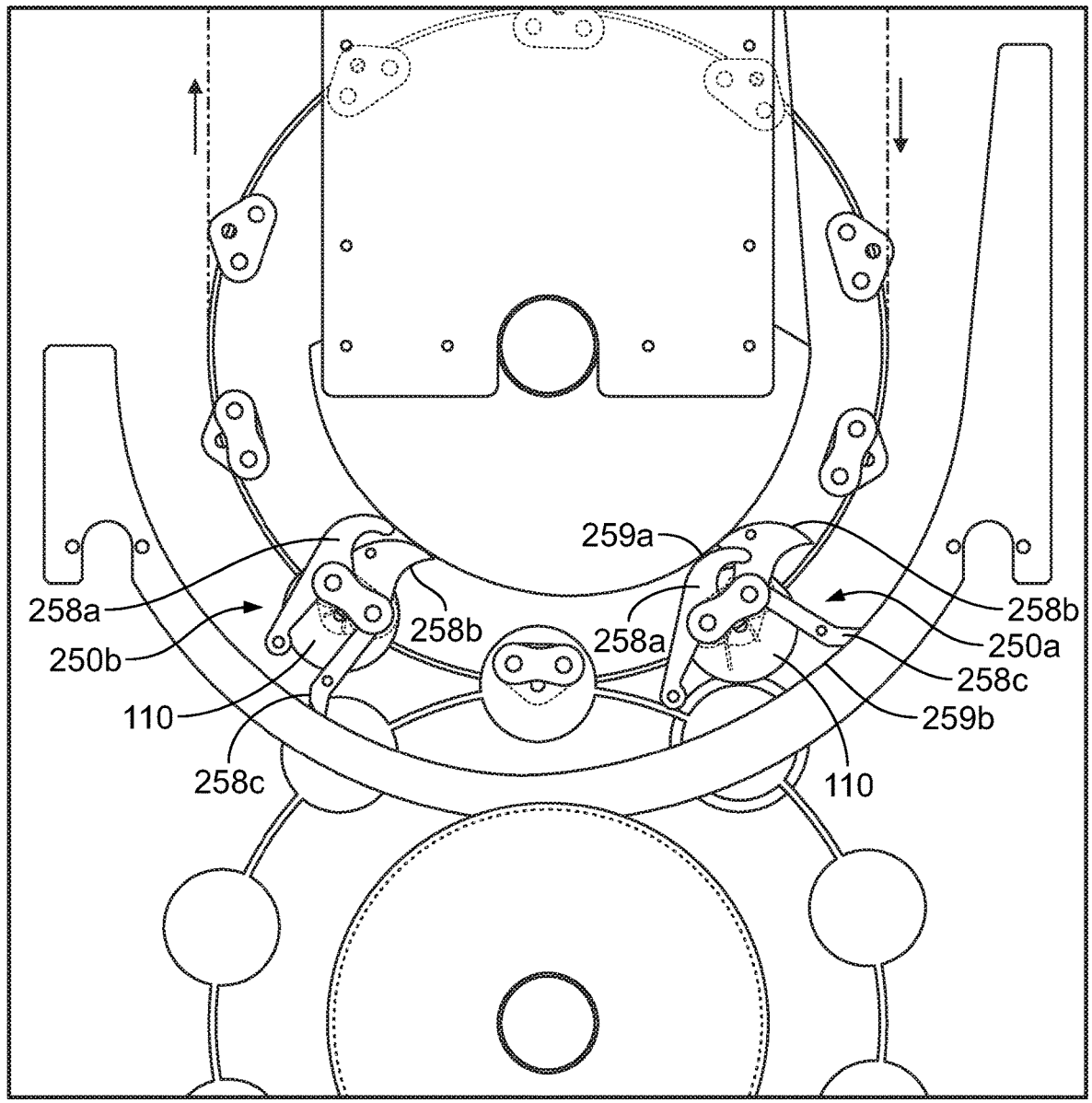
FIG. 10d illustrates a side view of the gripper device of FIGS. 10a-10c being used with a cam assembly.

Referring to FIGS. 10a-10d, a first device 250 is shown according to one embodiment. The device 250 is part of a multi-part mechanism and has a plurality (e.g., three) of independent, active fingers 252a-252c. The fingers 252a-252c are generally cylindrical in shape and may have grip pads 254 thereon or may include a coating or treatment for facilitating holding an article 110. It is contemplated that the fingers 252a-252c may have any suitable shape and/or size. The device 250 is coupled to the conveyor 166 by at least one solid pin 256 and a retainer clip 257. The device 250 of FIGS. 10a-10d includes a plurality (e.g., three) of actuators 258a-258c. Each of the fingers 252a-252c is coupled to a respective actuator 258a-258c. Thus, when the actuators 258a-258c are engaged via interaction with respective cams (e.g., inner cam 259a and outer cam 259b, as shown in FIG. 10d), the corresponding fingers 252a-252c will open or close accordingly, thereby gripping or releasing the article 110 positioned between the fingers 252a-252c. The cams 259a, 259b may assist in causing the fingers 252a-252c to open or close at generally the same time so that the position of the article 110 is not skewed or off-center. FIG. 10d shows one device 250a in the expanded position in which an article may enter into or be released from the device 250a and a second device 250b in the retracted position in which an article 110 is held by the device 250b. The device 250 of FIGS. 10a-10d does not require any axial displacement (i.e., along the z-axis). As such, actuation only occurs in the x-y plane.

Figure 11A:
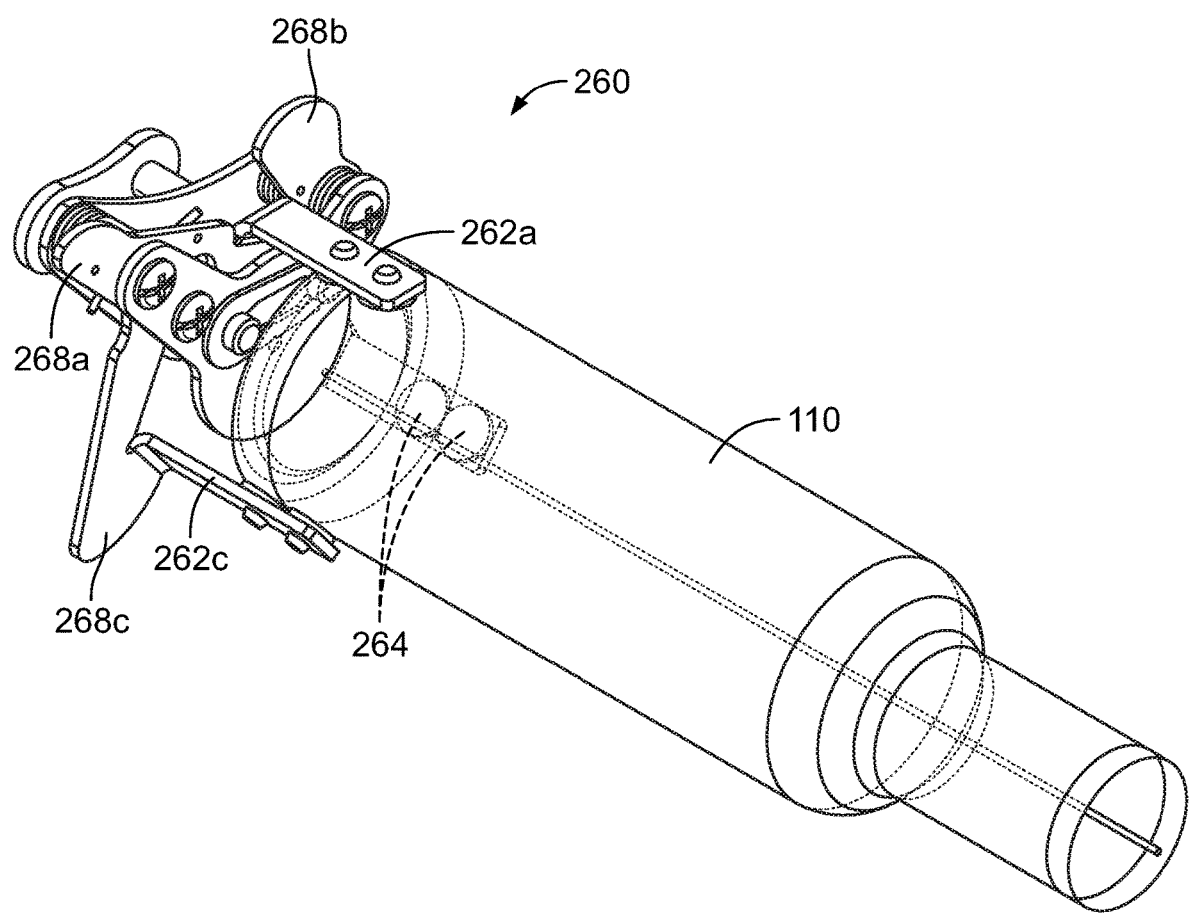
FIG. 11a illustrates a perspective view of a gripper device according to another embodiment.

FIGS. 11a-11c illustrate a second device 260 according to another embodiment. The device 260 of FIGS. 11a-11c is generally similar to that of FIGS. 10a-10d, except that the shapes of the actuators 268a-268c and the fingers 262a-262c coupled thereto are slightly different. In the embodiment of FIGS. 11a-11c, each of the fingers 262a-262c is generally flat and includes two grip pads 264. However, it is contemplated that the fingers 262a-262c may have any suitable shape and/or size and/or may include any number of grip pads or a coating or treatment for facilitating holding an article.

Figure 12A:
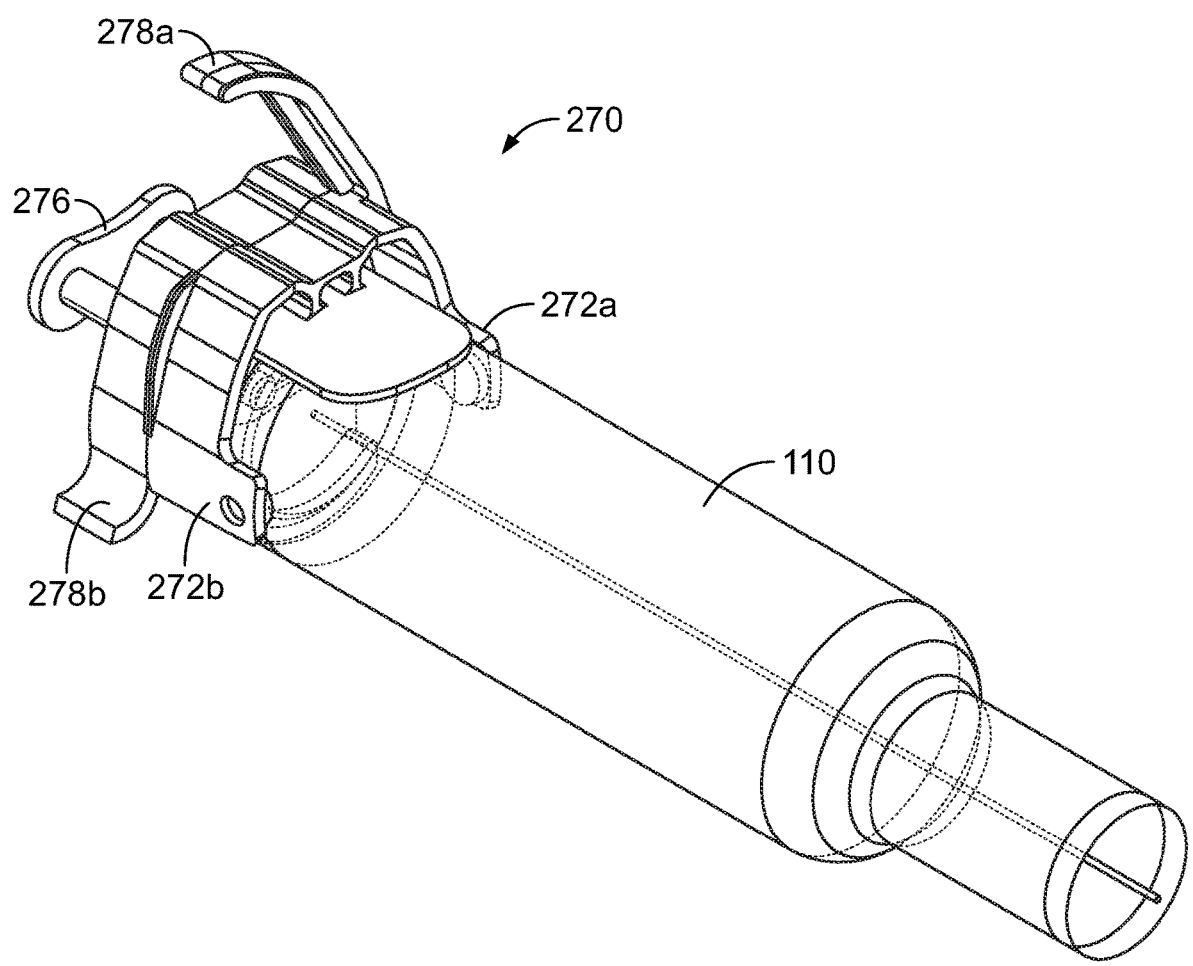
FIG. 12a illustrates a perspective view of a gripper device according to another embodiment.
Figure 12C:
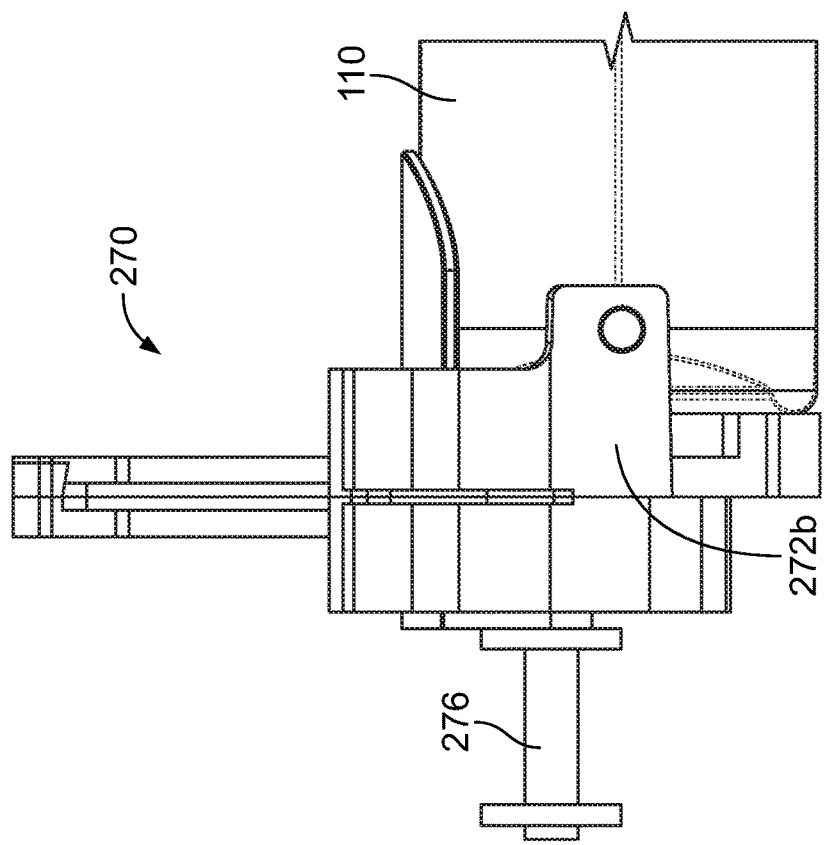
FIG. 12c illustrates a side view of the gripper device of FIGS. 12a, 12b.
Figure 12B:
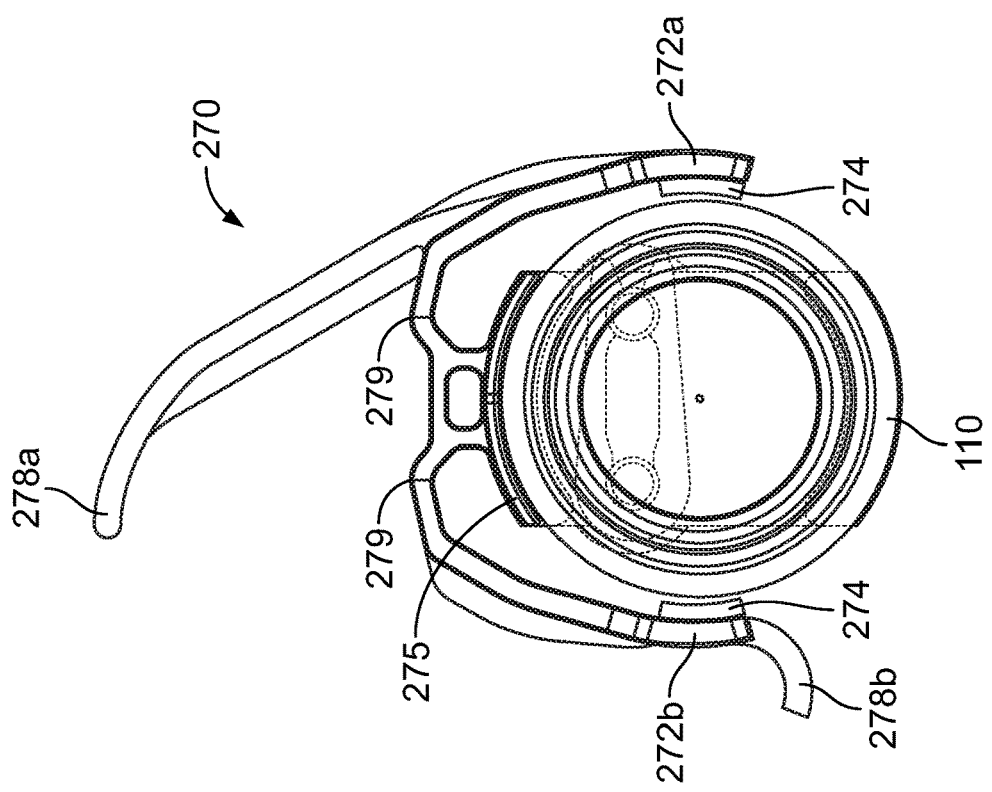

Referring to FIGS. 12a-12d, a third device 270, utilizing a molded plastic gripper, is shown according to one embodiment. The device 270 may be a single-part, unitized device including two independent, active fingers 272a-272b. The fingers 252a-252c may have grip pads 274 thereon or may include a coating or treatment for facilitating holding an article 110. The container 273 is further supported by a generally fixed surface 275 that generally corresponds with the shape of the sidewall of the container 273 with which the device 270 is being used. For instance, the surface 275 of FIGS. 12a-c is curved, having a generally arc-shape. It is contemplated that the surface 275 may also have a V-shape or another suitable shape. As shown in FIG. 12a, 12c, the surface 275 may extend axially in the direction of the container 273 to further provide further support thereto. The device 270 is coupled to the conveyor 166 by at least one solid pin 276 and a retainer clip (not shown).

Each of the fingers 272a-272b is coupled to a respective actuator 278a-278b. When the actuators 278a-278b are engaged via interaction with respective cams (not shown), the corresponding fingers 272a-272b will open or close accordingly, thereby gripping or releasing the container 273 positioned between the fingers 272a-272b.

Figure 12D:
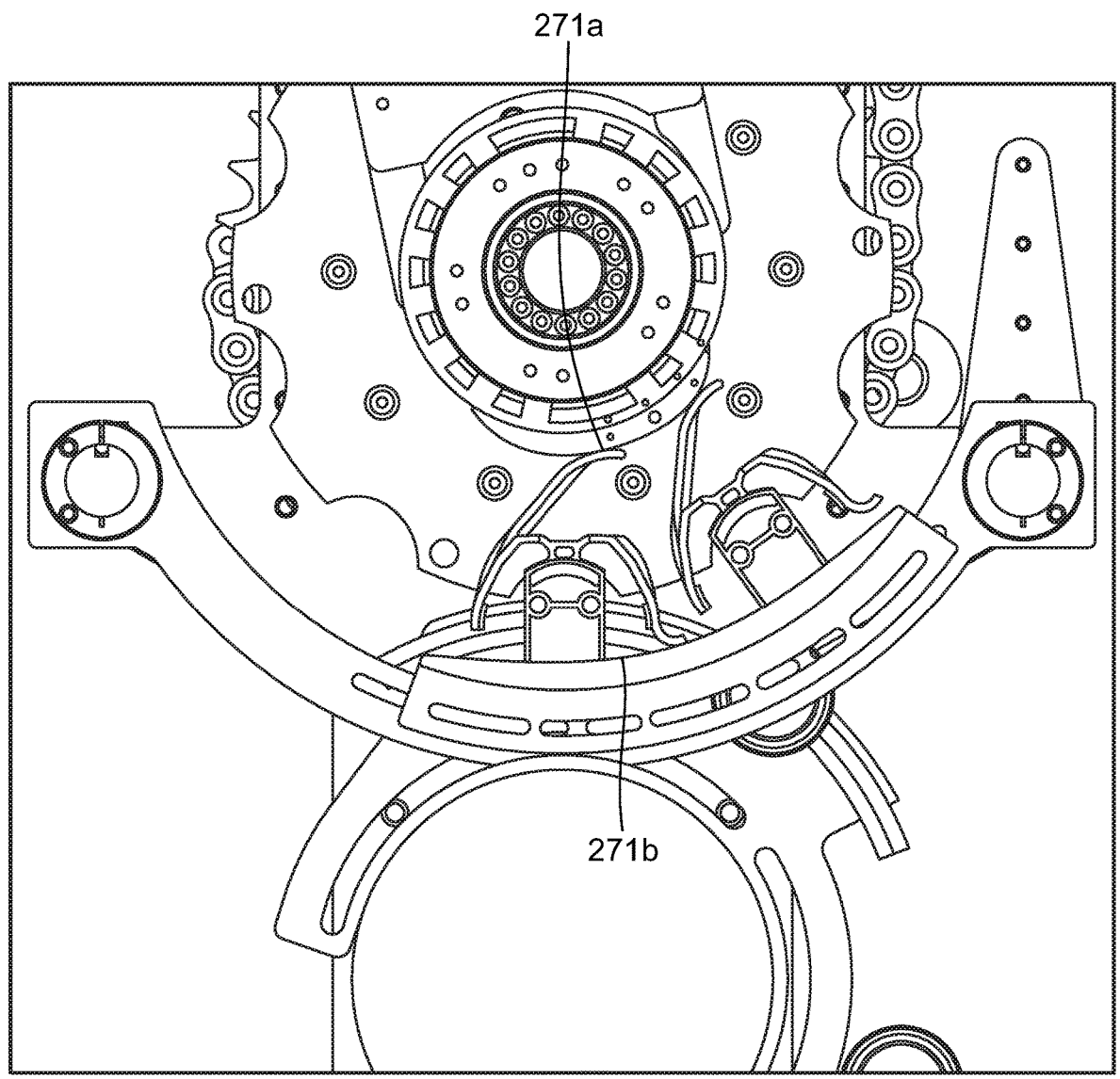
FIG. 12d illustrates a side view of the gripper device of FIGS. 12a-12c being used with a cam assembly.
Figure 13A:
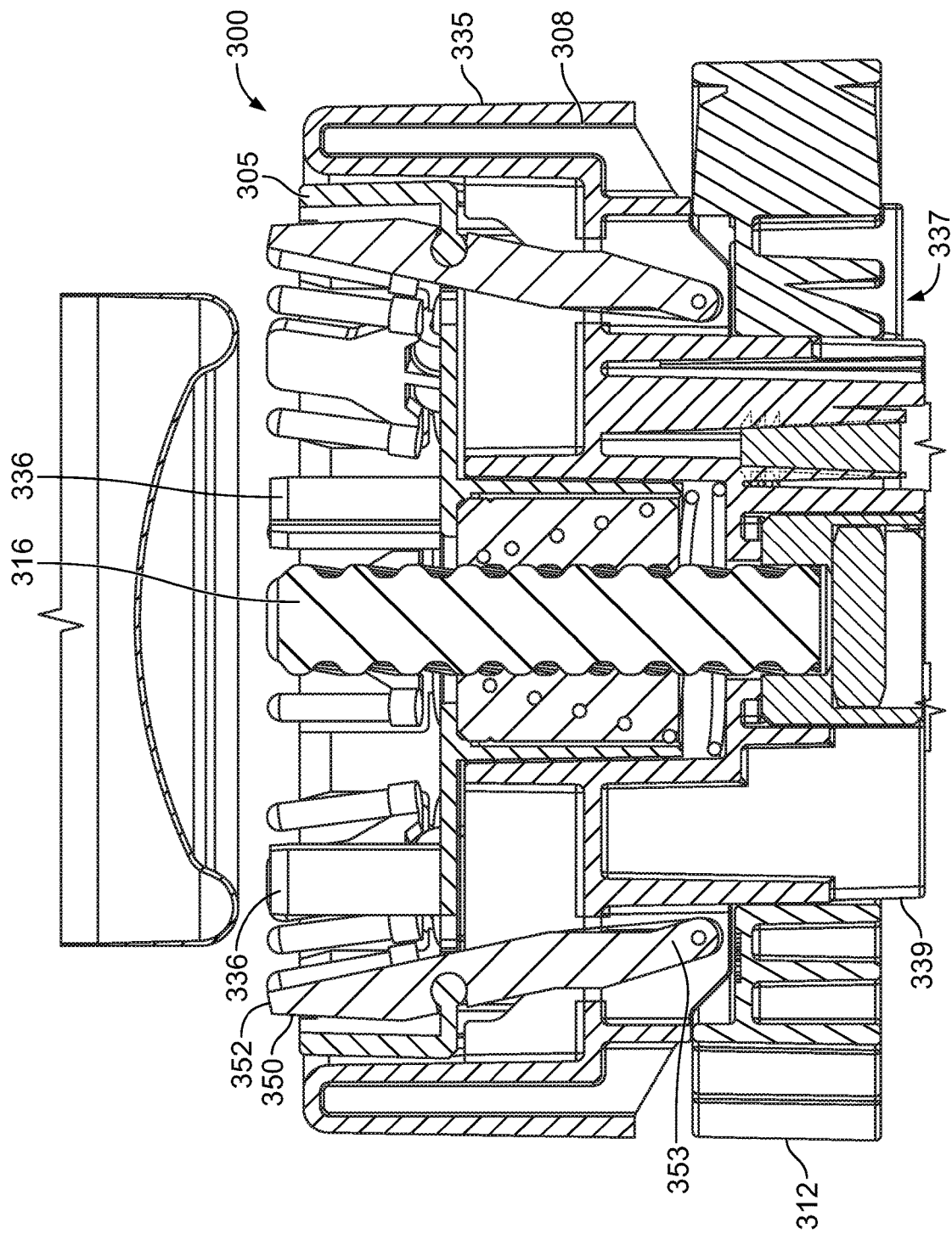
FIG. 13a illustrates a cross-sectional side view of a gripper device in a retracted position according to another embodiment.
Figure 13B:
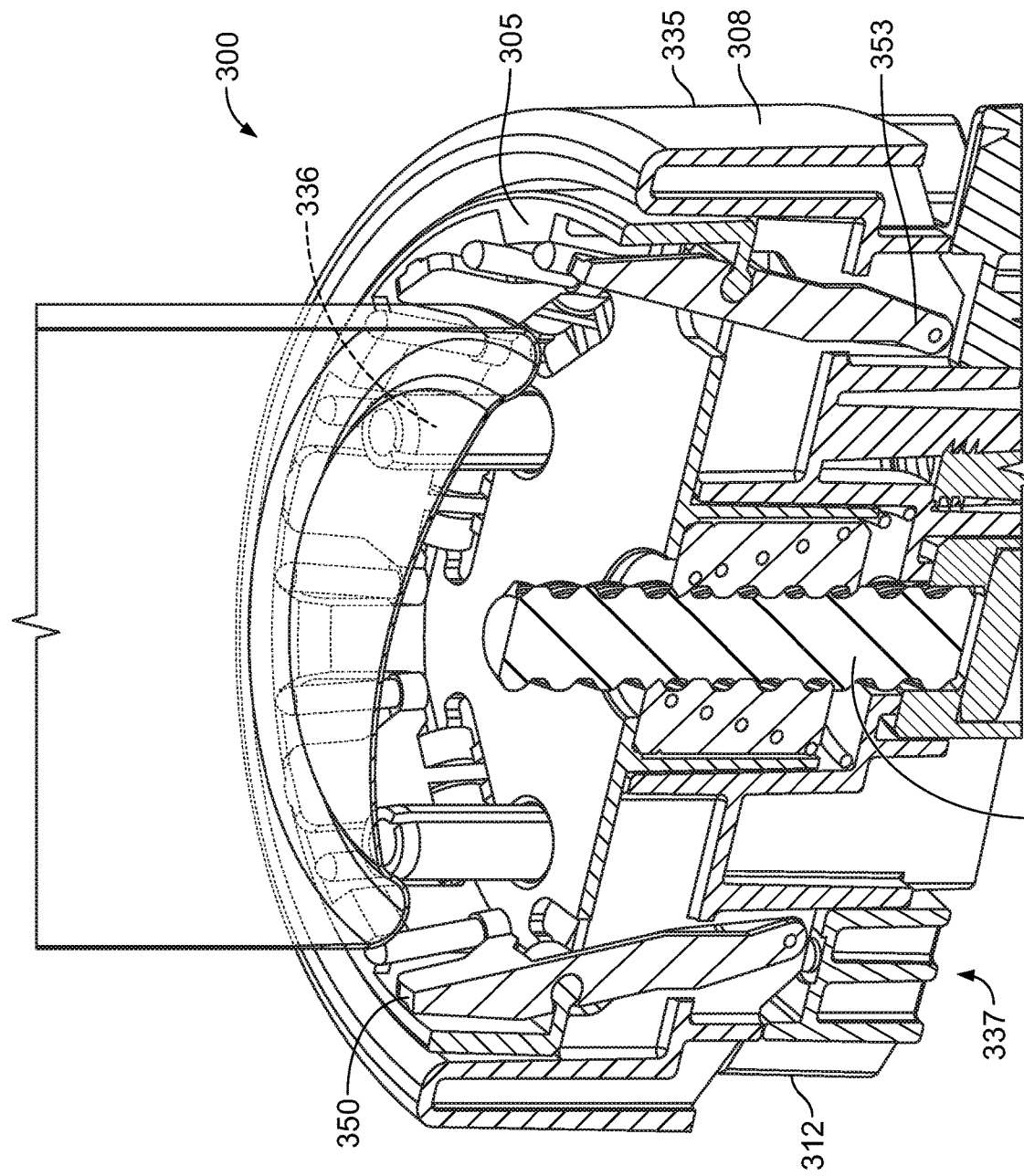
FIG. 13b illustrates a cross-sectional perspective view of the gripper device of FIG. 13a in the retracted position.
Figure 13C:
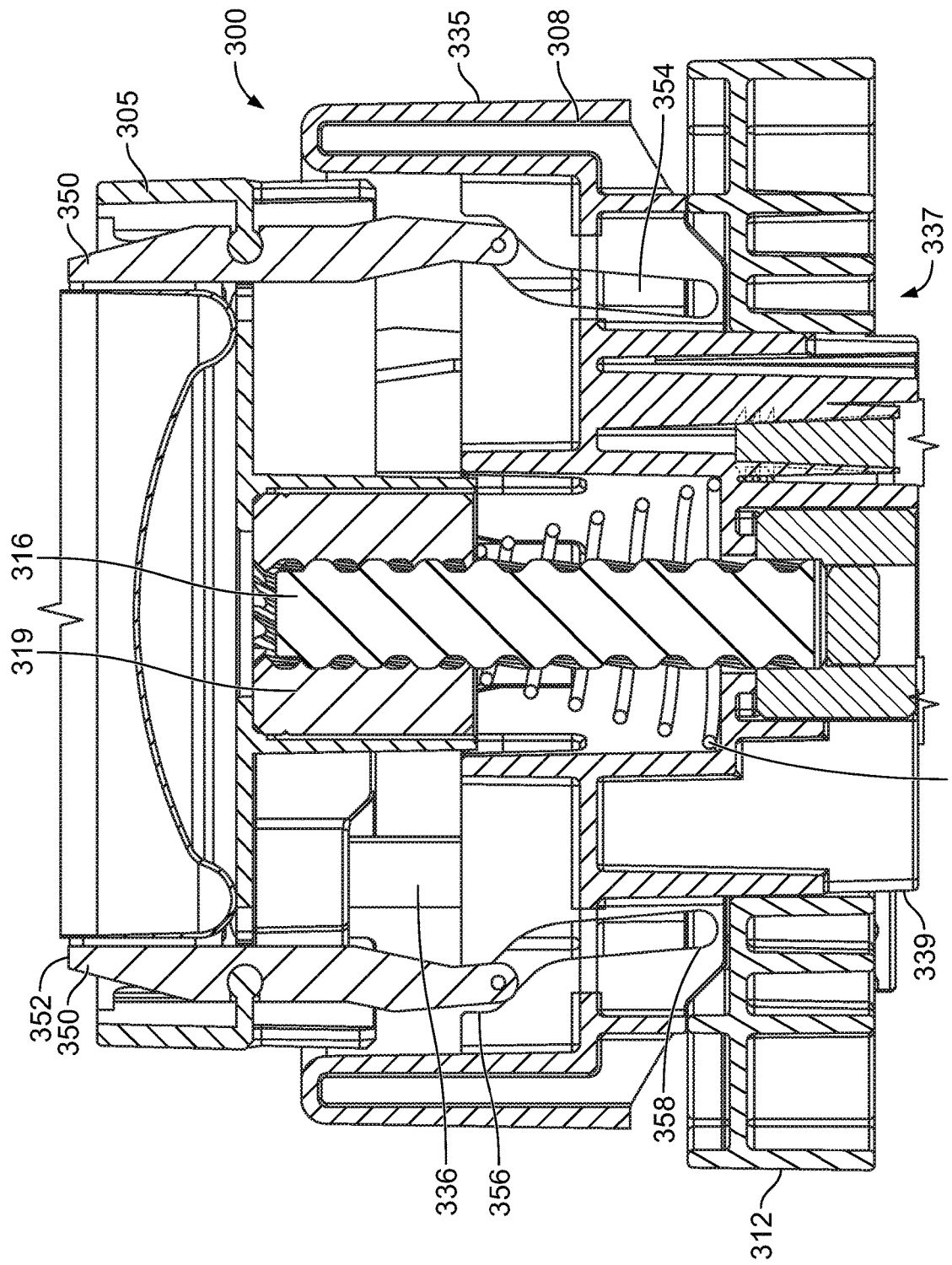
FIG. 13c illustrates a cross-sectional side view of the gripper device of FIGS. 13a, 13b in an extended position.
Figure 13D:
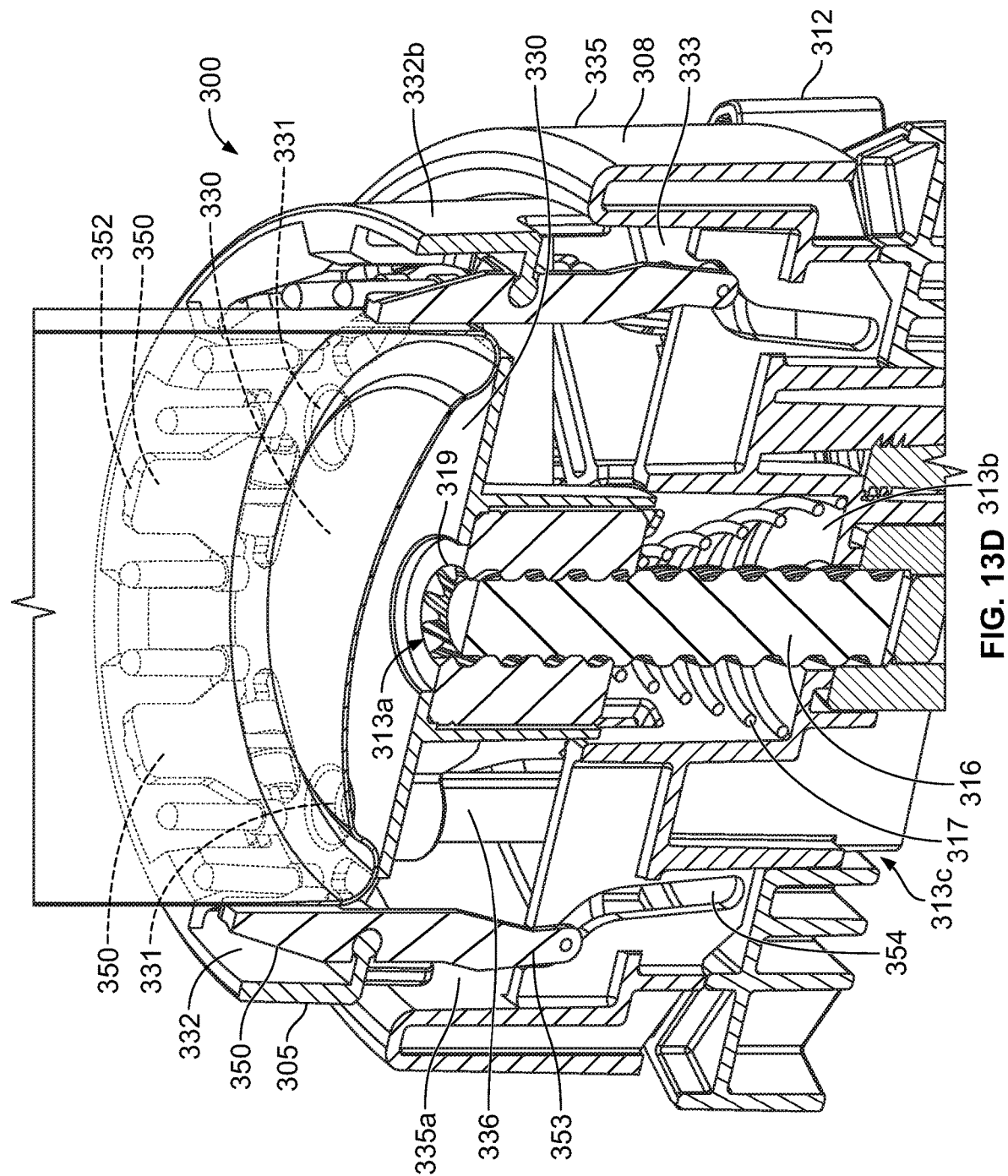
FIG. 13d illustrates a cross-sectional perspective view of the gripper device of FIGS. 13a-13c in the extended position.

The device 270 of FIGS. 12a-12c further includes a plurality of living hinges 279. When the actuators 278a-278b are engaged via interaction with respective cams (not shown), the corresponding fingers 272a-272b open or close via flexion at the respective living hinge 279. The cams may assist in causing the fingers 272a-272b to open or close at generally the same time so that the position of the container 273 is not skewed or off-center. Like the devices 250, 260 described with respect to FIGS. 10-11 above, the device 270 of FIGS. 12a-12c does not require any axial displacement (i.e., along the z-axis). As such, actuation only occurs in the x-y plane. Thus, when the actuators 278a-278b are engaged via interaction with respective cams (e.g., inner cam 271a and outer cam 271b, as shown in FIG. 12d), the corresponding fingers 272a-272b will open or close accordingly, thereby gripping or releasing the article 110 positioned between the fingers 272a-272b. The cams 271a, 271b may assist in causing the fingers 272a-272b to open or close at generally the same time so that the position of the article 110 is not skewed or off-center.

Referring to FIGS. 13a-13d, a gripper device 300 is shown according to another embodiment. The gripper device 300 is generally similar to the gripper device 200 of FIGS. 4a-4h, but the gripper device 300 of FIGS. 13a-13d uses a plurality of actuated fingers to grip and release the article 110. As such, the gripper device 300 is configured to be used with non-metallic articles where a magnetic mechanism is not sufficient for holding the article 110. It is contemplated, however, that the device 300 may also be used with metallic articles.

Like the gripper device 200 of FIGS. 4a-4h, the gripper device 300 includes a top portion 305 for contacting (and holding/releasing) a closed end of an article 110, a hub portion 308, an optional resilient device (e.g., a spring) 317 positioned between the top portion 305 and the hub portion 308, a pronged paddle wheel 312, and a drive screw 316. The top portion 305, the hub portion 308, and the pronged paddle wheel 312 are generally circular and include respective generally central apertures 313a, 313b, 313c therethrough for receiving the drive screw 316. The central aperture 313a of the top portion 305 includes a drive nut 319 mounted therein or integral therewith. The drive nut 319 is configured to mate with a threaded portion of the drive screw 316 (as explained in more detail above with respect to the gripper device 200 of FIGS. 4a-4h).

The top portion 305 further includes a contact surface 330 for contacting a closed end of the article 110 and a rim 332 extending from the perimeter of the contact surface 330 in an axial direction. The top portion 305 also includes a plurality of apertures 331 (see FIGS. 13b, 13d) extending from a bottom surface (not shown) to the contact surface 330.

The hub portion 308 of the gripper device 300 includes a top surface 333 and a wall 335 extending from the perimeter of the top surface 330 in an axial direction. The hub portion 308 has an inner diameter that is slightly larger than the outer diameter of the top portion 305 so that the top portion 305 may be received by the hub portion 308 such that an outer surface 332b of the rim 332 is adjacent to or generally abuts an inner surface 335a of the wall 335. The hub portion 308 further includes a plurality of ejection pins 336 extending upwardly from the top surface 333 in an axial direction. Each of the ejection pins 336 is configured to be received by a respective one of the plurality of apertures 331 for slidably coupling the top portion 305 to the hub portion 308 for axial translation motion. Thus, the top portion 305 is axially movable and generally radially fixed with respect to the hub portion 308.

In some embodiments, a bottom 337 of the hub portion 308 includes an extension 339 projecting therefrom. The extension 339 is rotatably coupled to the paddle wheel 312 such that the axial position—but not the rotational position—of the hub portion 308 is generally fixed with respect to the paddle wheel 312, as generally described above with respect to FIG. 5. As such, the paddle wheel 312 is generally axially fixed and rotatable with respect to the hub portion 308. It is contemplated that other suitable coupling features may also or alternatively be used.

In some embodiments, the paddle wheel 312 is generally similar to the paddle wheel 212 described above. For example, the paddle wheel 312 may engage the hub portion 308 in a manner similar to that of the gripping device 200 described above. Furthermore, the paddle wheel 312 may include a plurality of retract prongs 338a-338c and a plurality of extend prongs 342a-342d. It is also contemplated that the axial movement of the top portion 305 relative to the hub portion 308 and paddle wheel 312 along the cylindrical axis may occur in the same or a similar manner as described above with respect to the gripper device 200 of FIGS. 4a-4h to receive/grip and/or release the article 110 from the gripper device 300.

In the embodiment of FIGS. 13a-d, the article 110 is secured to the top portion 305 of the gripper device 300 via a plurality of actuated fingers 350 that are configured to open and shut around the article 110. The actuated fingers 350 are hingedly coupled to the top surface 330 of the top portion 305 and are configured to move in a radial direction toward and away from the center of the top portion 305. It is contemplated that mechanisms other than a hinge may be used to move the actuated fingers 350 such as, for example, a sliding cam mechanism. For example, sliding elements may be cammed in and out, e.g., similar to side action cams used in injection molding. In a sliding cam embodiment, instead of the actuated fingers 350 being fixed about a single pivot point and engaging a moving cam path in the top portion 305, the finger(s) engage in a cam path or along a cam mounted in or on the top surface 330 and also at a separate point via a cam path in 305, as described, for example in U.S. Pat. No. 7,387,505, incorporated herein by reference.

The actuated fingers 350 are generally elongated in shape and are positioned generally parallel to the rim 332 and wall 335. Specifically, a top 352 of each of the actuated fingers 350 extends in a generally axial direction away from the top portion 305, and a bottom 353 of each of the actuated fingers 350 extends in a generally opposite direction into a respective aperture 354 formed in the top 333 of the hub portion 308.

The apertures 354 formed in the hub portion 308 extend inwardly from the top 333 of the hub portion 308 downward toward the center of the hub portion 308 and act as a cam. A bottom 353 of each actuated finger 350 enters into the top 356 of a respective aperture 354 when actuating the device 300. Thus, each actuated finger 350 mates with the aperture 354 and acts as a cam follower. As such, when the gripper device 300 is in an extended position, (see FIGS. 13c, 13d) the bottom 353 of the actuated finger 350 contacts the top 356 of the aperture 354, thereby causing the top 350 of the actuated finger 350 to tilt inward toward a center of the top portion 305. As such, the actuated fingers 350 assist in holding the article 110 in place on the gripper device 300. When the gripper device 300 is in a retracted position (see FIGS. 13a, 13b), each of the actuated fingers 350 is generally within a respective aperture 354 such that the bottom 353 of the actuated finger 350 contacts the bottom 358 of the aperture 354. This causes the top 350 of the actuated finger 350 to tilt outward toward the rim 332 of the top portion 305. As such, the actuated fingers 350 assist in releasing the article 110 from the gripper device 300.

Figure 14A:
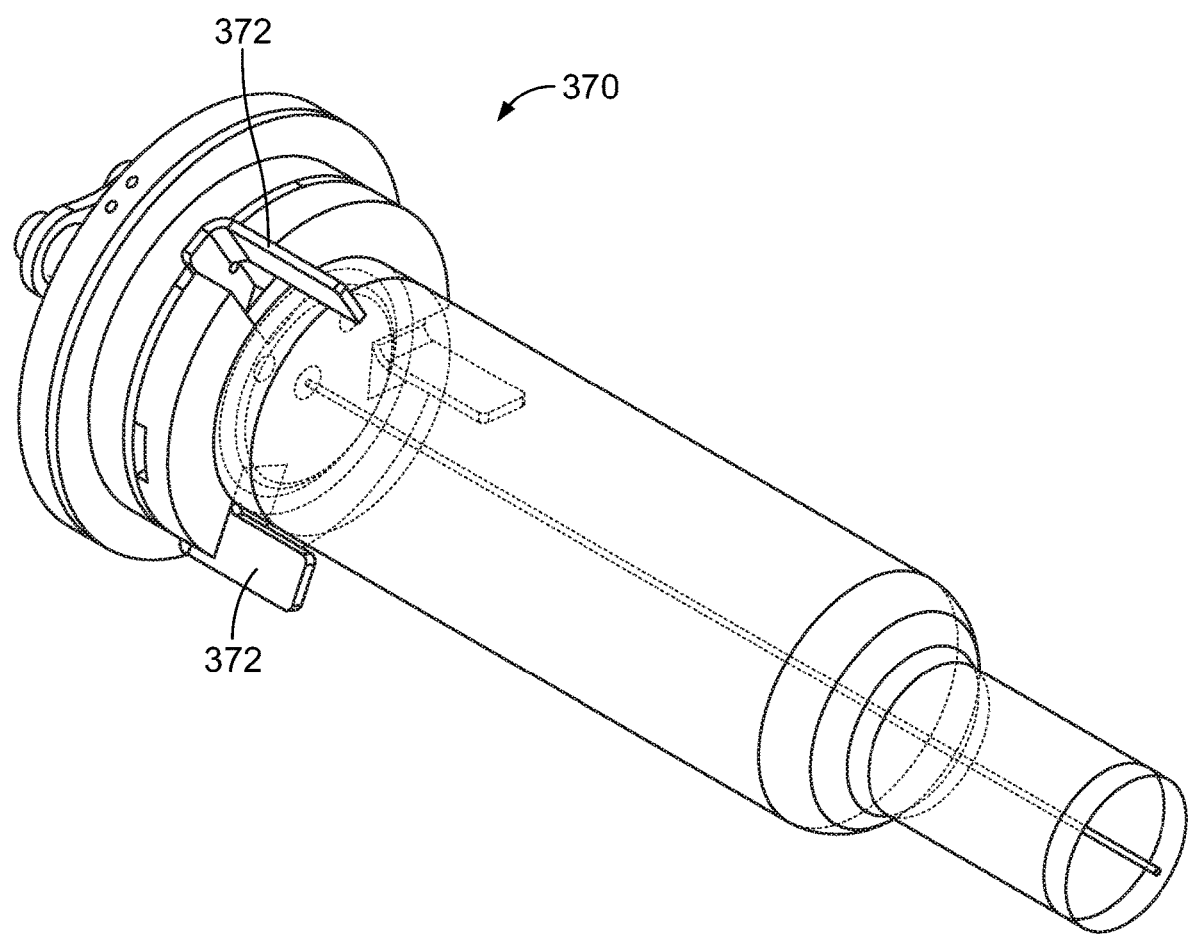
FIG. 14a illustrates a perspective view of a gripper device according to another embodiment.
Figure 14C:
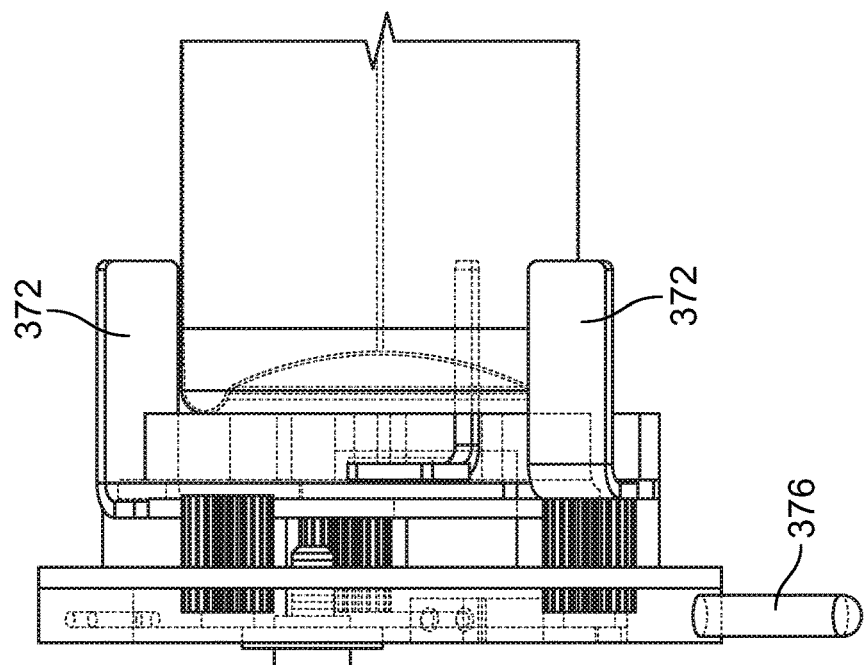
FIG. 14c illustrates a side view of the gripper device of FIGS. 14a, 14b.
Figure 14B:
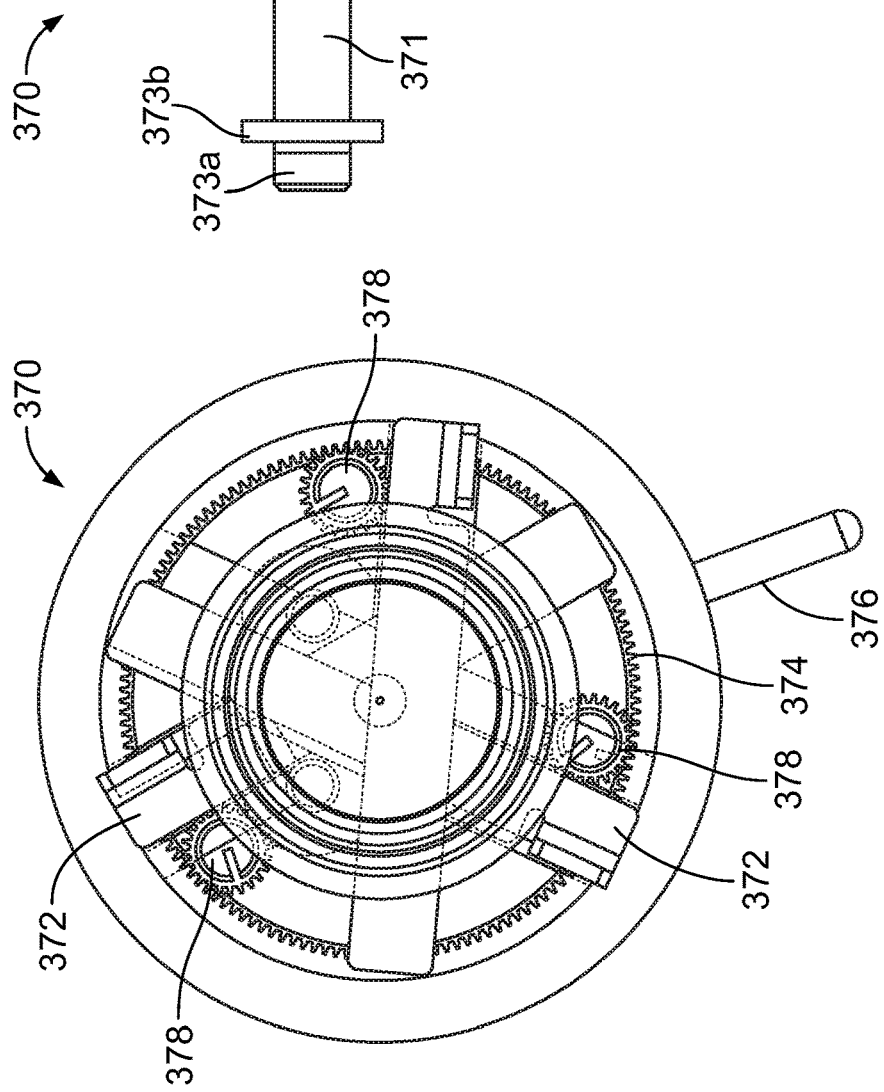

Referring to FIGS. 14a-14c, a gripper device 370 is shown according to another embodiment. The gripper device 370 utilizes non-axial motion to move a plurality of arms 372 to hold and release an article 110. When the plurality of arms 372 is in an open position, the article may pass therebetween, and when the plurality of arms 372 is in a closed position, the arms 372 assist in holding the article 110 in place. A rack and pinion mechanism (see FIG. 14b) is used to move the arms 372. A sun gear 374 rotates around a central axis via one or more external actuators 376. The arms 372 are actuated by the external actuator 376. Planetary gears 378 positioned on a pinion rack move the plurality of arms 372 in and out, thereby converting circular motion into linear motion. The embodiment of FIGS. 14a-14c utilizes a hollow pin chain, whereby the gripper device 370 is coupled to a chain using a screw or other suitable mechanism.

In embodiments utilizing a hollow pin chain, a post 371 may protrude with a socket head cap screw 373a and a washer 373b threaded in to the post (see FIGS. 10c, 11c, and 14c). The post 371 may extend through an aperture 375 in a hollow pin chain 377 (see FIG. 15) to mount the gripper device to the chain 377. Although certain embodiments described herein are described as utilizing a hollow pin/ hollow pin chain, it is contemplated that a solid pin/retainer clip may also be used and vice versa.

Figure 15:
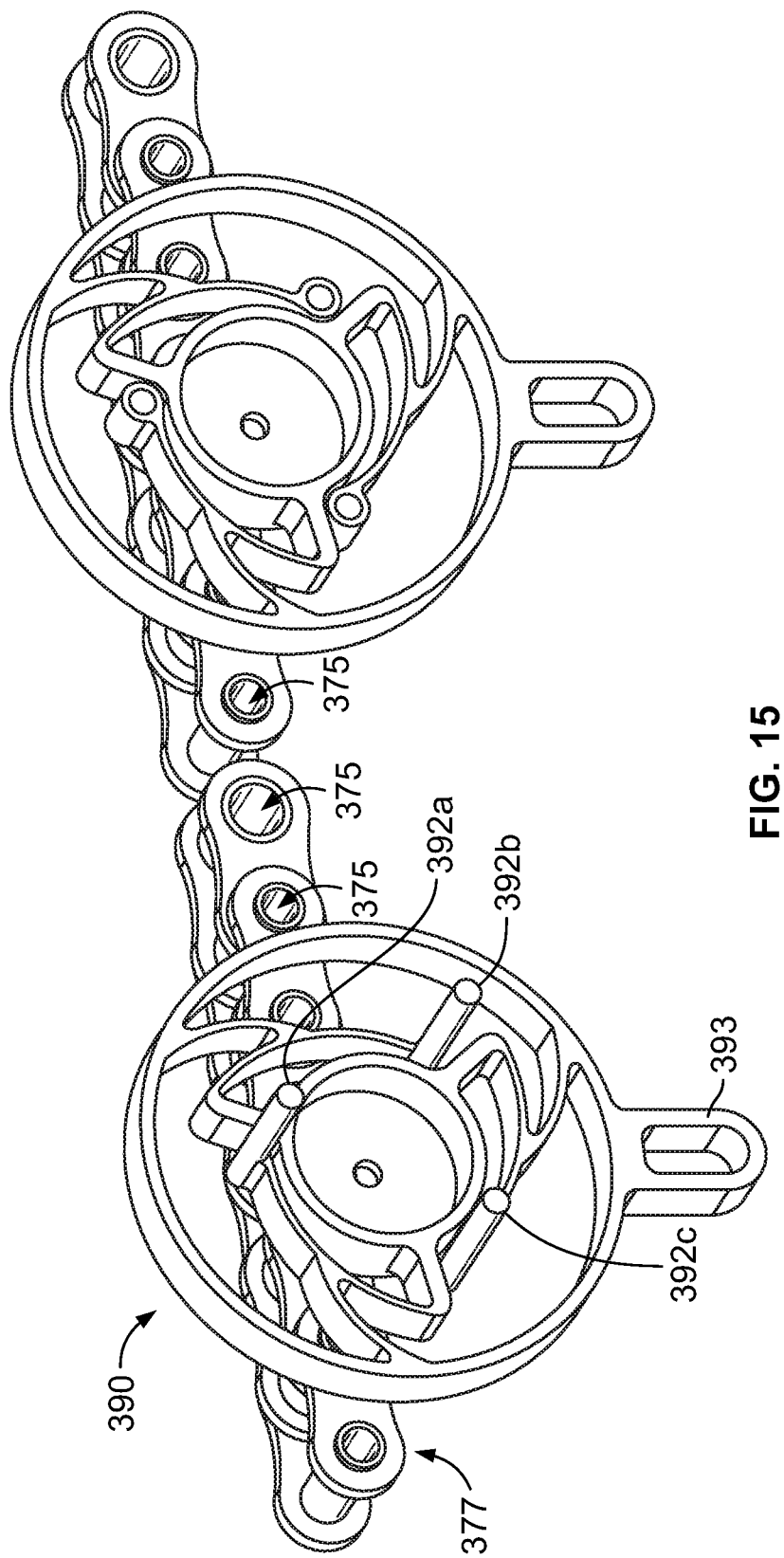
FIG. 15 illustrates a perspective view of a plurality of gripper devices positioned on a chain according to another embodiment.

Referring to the embodiment of FIG. 15, a gripper device 390 for cam actuation is shown. The device 390 is part of a single-part mechanism and has a plurality (e.g., three) of independent, active fingers 392a-392c. In the illustrated embodiment, the fingers 392a-392c are generally cylindrical in shape and may have grip pads (not shown) thereon or may include a coating or treatment for facilitating holding an article 110. It is contemplated that the fingers 392a-392c may have any suitable shape and/or size. The device 390 is coupled or snap-fitted to the conveyor 166 by an outer link. When an actuator arm 393 of the device 390 interacts with respective cams, the corresponding fingers 392a-392c will open or close accordingly, thereby gripping or releasing the article 110 positioned between the fingers 392a-392c. The device 390 of FIG. 15 does not require any axial displacement (i.e., along the z-axis). As such, actuation only occurs in the x-y plane.

Figure 16A:
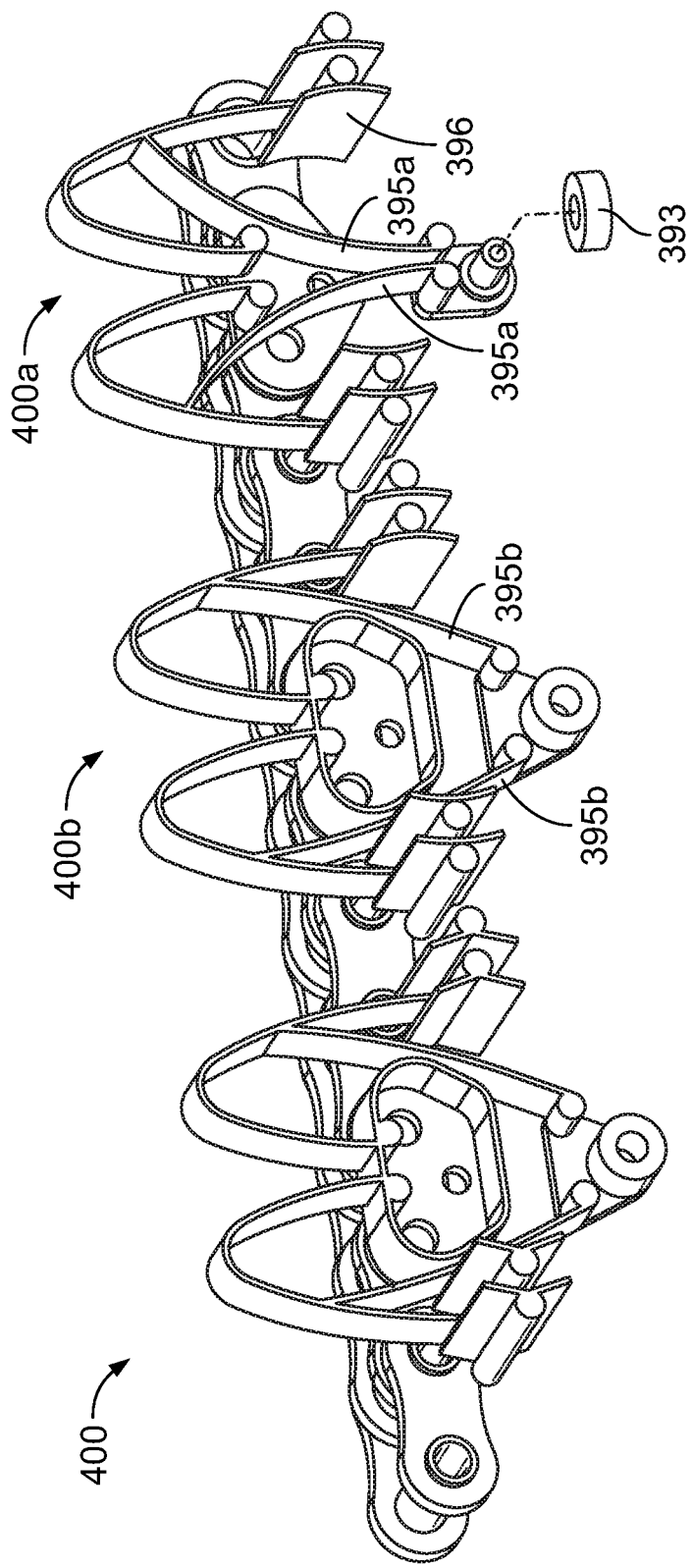
FIG. 16a illustrates a perspective view of a plurality of gripper devices positioned on a chain according to yet another embodiment.
Figure 16B:
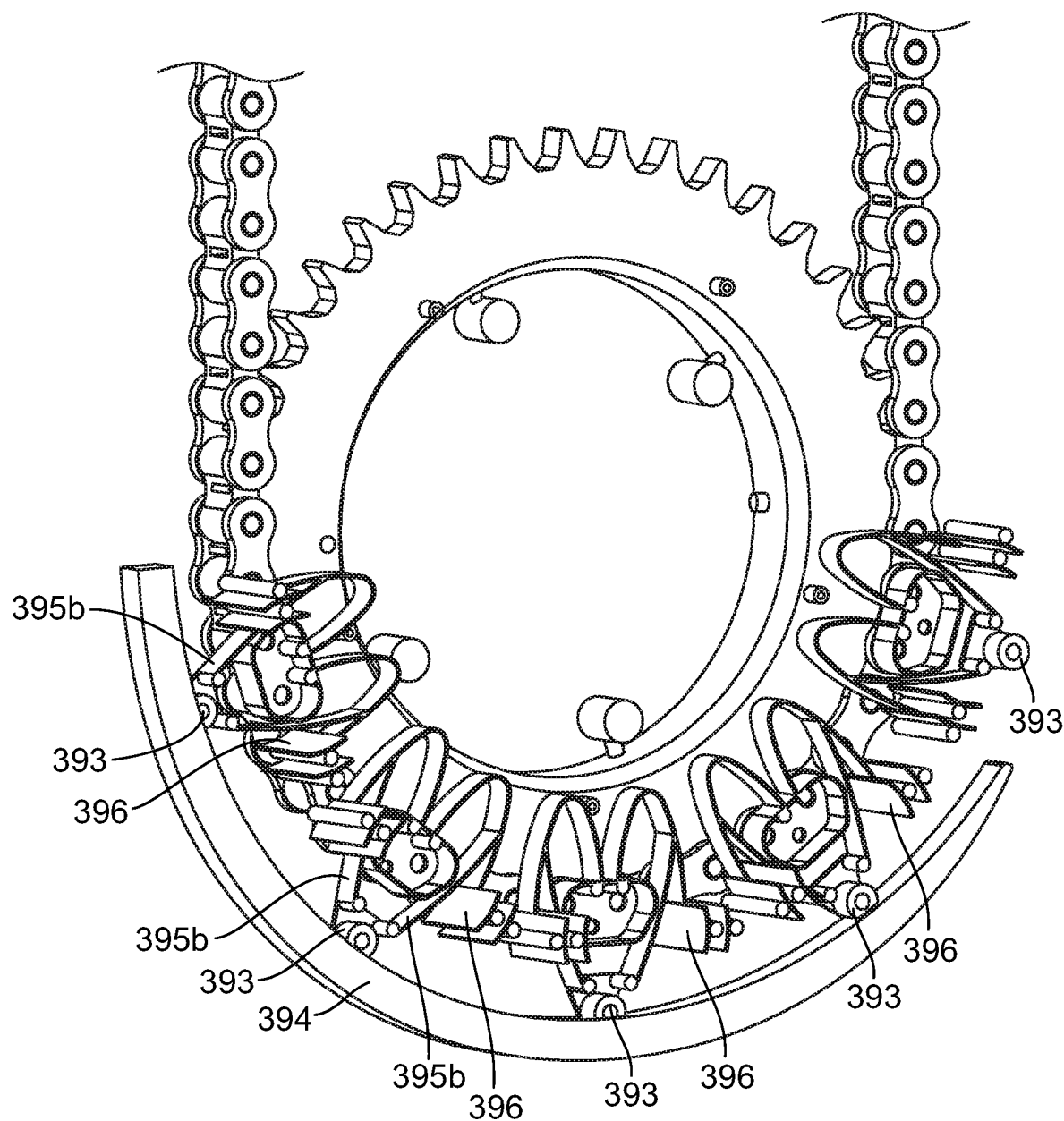
FIG. 16b illustrates the gripper devices of FIG. 16a being used with a cam assembly.

Referring to the embodiment of FIG. 16a-16b, exemplary gripper devices 400a, 400b for cam actuation are shown. The first gripper device 400a includes a pair of concave arms 395a, and the second gripper device 400b includes a pair of convex arms 395b. It is contemplated that each of the concave and convex gripper devices 395a, 395b may be used generally interchangeably. The gripper device 395a, 395b includes a roller 393 that interfaces with a cam 394, as shown in FIG. 16b, thereby displacing the roller 393 and the pair of arms 395 connected thereto. This displacement causes grip pads 396 positioned at the ends of the connected arms 395 to open or close, depending on the displacement of the roller 393 and its relative direction.

While the above-described system 100 includes forming starwheels 202 with ten pockets thereon, it is contemplated that other numbers of pockets may be used. The number of recirculations possible in such a system is determined by the number of pockets on the forming starwheels. That is, the number of passes is a factor of the number of starwheel pockets. For example, a system having ten-pocket line starwheels can accommodate one, two, five, or ten passes through the line starwheels. In another example, a system having twelve-pocket forming starwheels can accommodate one, two, three, four, six, or twelve passes through the line starwheels.

The number of stages needed to achieve a desired modification of an article is generally constant, so increasing the number of passes performed by a single system allows the total number of line starwheels to be reduced. For example, a single-pass system may require 50 line starwheels to achieve the desired modification, whereas a five-pass system may require only 10 line starwheels to achieve that same modification. It is contemplated that certain processing or machine limitations may slightly increase the minimum number of starwheels needed. It is further contemplated that some systems may employ only a single line starwheel and recirculate the articles between pockets of the starwheel.

While the above-described system 100 includes a generally linear configuration of the line starwheels 104, it is contemplated that different configurations may be used. For example, in some embodiments, the line starwheels 104 are arranged in a non-linear configuration such as that described in U.S. Patent Application Publication No. 2010/0212393, U.S. Patent Application Publication No. 2010/0212394, and/or U.S. Patent Application Publication No. 2013/0149073, each of which is incorporated herein by reference in its entirety.

While the above-described system 100 controls the linear distance traveled by the working side 166a to phase shift the articles 110, it is contemplated that different methods may be used.

While the above-described system 100 is arranged with the starwheels 202a,b having axes that are disposed generally horizontally, it is contemplated that the starwheels 202a,b may be oriented to have axes that are disposed generally vertically. Similarly, while the above-described recirculation line 166 is oriented generally in a vertical plane, it is contemplated that the recirculation line 166 may be oriented along a horizontal plane. Moreover, while the above-described recirculation line 166 travels generally along two dimensions, it is contemplated that the recirculation line 166 may travel through three dimensions. Beneficially, traveling through three dimensions can be used to reduce the overall space (e.g., height) occupied by the machine line.

While the above-described system 100 includes a serial arrangement of starwheel pockets 140, it is contemplated that other configurations may be used, for example, where the preceding-pass pocket is not adjacent the subsequent-pass pocket.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

The invention claimed is:

1. A device for transporting articles through a recirculation system used for forming or processing the articles, the device comprising:
a top portion configured to contact an article, the top portion having a drive nut positioned within a first generally central aperture, the top portion further including a plurality of apertures;
a hub portion having a second generally central aperture, the hub portion further including a plurality of ejection pins extending therefrom, the plurality of ejection pins configured to extend through a respective one of the plurality of apertures of the top portion such that the hub portion is slidably coupled to the top portion;
a paddle wheel being rotatably coupled to the hub portion, the paddle wheel having a first plurality of prongs and a second plurality of prongs, the first and second plurality of prongs extending radially outward, the first plurality of prongs and the second plurality of prongs being offset in generally opposing directions, the paddle wheel further including a post projecting radially inward and positioned within a third generally central aperture; and
a drive screw extending through the first, second, and third apertures, the drive screw having a head and a generally opposing threaded end, the head being configured to engage the post, and the threaded end being configured to engage the drive nut.

2. The device of claim 1, further comprising a resilient device positioned between the top portion and the hub portion.

3. The device of claim 1, wherein the article is comprised of a magnetic material, the top portion including one or more magnets for securing the article.

4. The device of claim 1, wherein the hub portion further includes one or more mounting features for mounting the gripper device to a conveyor.

5. The device of claim 1, wherein the hub portion includes an extension having a generally ring-shaped portion and a generally arc-shaped portion extending therefrom, an outer wall of the extension being adjacent to an inner surface of the paddle wheel.

6. The device of claim 5, wherein a top surface of the post is adjacent to a bottom of the ring-shaped portion, a first side of the post being configured to be adjacent to a first end of the arc-shaped portion when the paddle wheel is rotated in a first direction, and a second opposing side of the post being configured to be adjacent to a second opposing end of the arc-shaped portion when the paddle wheel is rotated in a second direction.

7. The device of claim 1, wherein the top portion and the hub portion are generally round, an outer diameter of the top portion being smaller than an inner diameter of the hub portion.

8. The device of claim 1, wherein the hub portion further includes flexible retention tabs for axially securing the paddle wheel thereto.

9. The device of claim 1, wherein the top portion further includes a rim extending from the perimeter of the contact surface in an axial direction.

10. The device of claim 1, wherein the hub portion further includes a wall extending from the perimeter of a top surface thereof in an axial direction.

11. The device of claim 1, wherein the top portion further includes a plurality of actuated fingers configured to open and shut around a respective article.

12. The device of claim 11, wherein the actuated fingers are coupled to the top portion, a bottom of each of the actuated fingers extending into a respective hub aperture formed in the hub portion, a top of each of the actuated fingers extending away from the top portion in a generally opposite direction, wherein a bottom portion of the hub aperture is positioned closer to the center of the hub portion than a top portion of the hub aperture.

13. A recirculation system for transporting a plurality of articles being processed, the system comprising:
a plurality of line starwheels being cooperatively arranged to form a process line, each of the plurality of line starwheels including a plurality of starwheel pockets thereon; and
a recirculation line including
a conveyor,
a plurality of gripper devices coupled to the conveyor, the plurality of gripper devices configured to secure and transport the plurality of articles along the recirculation line, each of the plurality of gripper devices including a top portion having an article contact surface and a plurality of apertures therethrough, each of the plurality of gripper device further including a plurality of ejection pins configured to extend through a respective one of the plurality of apertures, each of the plurality of gripper device further including a paddle wheel having a first plurality of prongs and a second plurality of prongs extending generally radially outward therefrom, the first and second plurality of prongs being offset in generally opposing directions, the paddle wheel being rotatable with respect to the top portion, a first actuator located at a first position along the recirculation line, the first actuator having a first plurality of teeth configured to engage the first plurality of prongs to cause the paddle wheel to rotate in a first direction such that the plurality of ejection pins extends from the plurality of apertures, and a second actuator located at a second position along the recirculation line, the second actuator having a second plurality of teeth configured to engage the second plurality of prongs to cause the paddle wheel to rotate in a second direction such that the plurality of ejection pins retracts from the plurality of apertures.

14. The system of claim 13, wherein the gripper device further comprises a hub portion positioned between the top portion and the paddle wheel, the plurality of ejection pins being positioned on the hub portion.

15. The system of claim 14, wherein the top portion is axially movable and generally radially fixed with respect to the hub portion, and the paddle wheel is generally axially fixed and rotatable with respect to the hub portion.

16. The system of claim 15, wherein the gripper device further includes a drive screw having a first end and a second end having threads thereon, and the top portion further includes a drive nut positioned within a generally central aperture, the first end of the drive screw being coupled to the paddle wheel and the second end of the drive screw being engaged with the drive nut.

17. The system of claim 14, wherein the top portion further includes a plurality of actuated fingers configured to open and shut around a respective article, the actuated fingers being hingedly coupled to the top portion, a bottom of each of the actuated fingers extending into a respective hub aperture formed in the hub portion, a top of each of the actuated fingers extending away from the top portion in a generally opposite direction, wherein a bottom portion of the hub aperture is positioned closer to the center of the hub portion than a top portion of the hub aperture.

18. The system of claim 13, further comprising a plurality of line starwheels being cooperatively arranged to form a process line, each of the plurality of line starwheels including a plurality of starwheel pockets thereon.

19. The system of claim 13, further comprising a servo motor configured to drive and synchronize the rotation of one or more of the line starwheels.

20. A method of modifying articles comprising:
providing an article to be modified to a plurality of line starwheels, each of the plurality of line starwheels including a plurality of starwheel pockets thereon;
modifying the article using at least one of the line starwheels to form a first-pass article;
transferring the first-pass article to a gripper device coupled to a conveyor of a recirculation line, the gripper device being in an extended position, the gripper device including a top portion having an article contact surface and a plurality of apertures therethrough, the gripper device further including a plurality of ejection pins configured to extend through a respective one of the plurality of apertures, the gripper device further including a paddle wheel having a first plurality of prongs and a second plurality of prongs extending generally radially outward therefrom, the first and second plurality of prongs being offset in generally opposing directions, the paddle wheel being rotatable with respect to the top portion;
moving the gripper device along the recirculation line to contact a first actuator along the path of the recirculation line, each of the first plurality of prongs on the paddle wheel engaging a respective one of a plurality of teeth of the first actuator;
in response to the plurality of teeth of the first actuator engaging a respective one of the first plurality of prongs of the gripper device, rotating the paddle wheel in a first direction such that a plurality of ejection pins extends through the contact surface of the gripper device, the ejection pins pushing the closed bottom surface of the first-pass article away from the contact surface such that the article is released from the gripper device;
further moving the gripper device along the recirculation line to contact a second actuator along the path of the recirculation line, each of the second plurality of prongs on the gripper device engaging with a respective one of a plurality of teeth of the second actuator; and
in response to the plurality of teeth of the second actuator engaging a respective one of the second plurality of prongs, rotating the paddle wheel in a second direction such that a plurality of ejection pins retracts through the contact surface of the gripper device such that the gripper device is in an extended position configured to receive a second article.

* * * * *